(12) United States Patent
Ito et al.

(10) Patent No.: US 11,958,219 B2
(45) Date of Patent: Apr. 16, 2024

(54) FOAM MOLDED PRODUCT AND MANUFACTURING METHOD THEREFOR

(71) Applicant: Nissha Co., Ltd., Kyoto (JP)

(72) Inventors: Tatsuo Ito, Kyoto (JP); Kenji Okumura, Kyoto (JP); Jun Sasaki, Kyoto (JP); Daichi Hama, Kyoto (JP); Masaru Terashita, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 905 days.

(21) Appl. No.: 16/961,652

(22) PCT Filed: Mar. 25, 2019

(86) PCT No.: PCT/JP2019/012309
§ 371 (c)(1),
(2) Date: Jul. 10, 2020

(87) PCT Pub. No.: WO2019/225140
PCT Pub. Date: Nov. 28, 2019

(65) Prior Publication Data
US 2020/0338793 A1    Oct. 29, 2020

(30) Foreign Application Priority Data

May 23, 2018 (JP) .................................. 2018-098797

(51) Int. Cl.
*B29C 44/12* (2006.01)
*B29K 105/04* (2006.01)
*B29L 31/34* (2006.01)

(52) U.S. Cl.
CPC ...... *B29C 44/1266* (2013.01); *B29K 2105/04* (2013.01); *B29L 2031/3475* (2013.01)

(58) Field of Classification Search
CPC ............ B29C 44/1266; B29C 44/1228; B29C 44/1271; B29C 44/14; B29K 2105/04; B29L 2031/3475
See application file for complete search history.

(56) References Cited

U.S. PATENT DOCUMENTS

2019/0115547 A1\* 4/2019 Lee ...................... B32B 27/281
2019/0135199 A1\* 5/2019 Galan Garcia ........ B60K 35/00
(Continued)

FOREIGN PATENT DOCUMENTS

DE         103 52 044       6/2005
DE     10 2006 008 385      8/2007
(Continued)

*Primary Examiner* — Nahida Sultana
(74) *Attorney, Agent, or Firm* — JCIPRNET

(57) ABSTRACT

The present disclosure provides a foam molded product and a manufacturing method. The foam molded product is includes a foam body, an insert material having a display unit or a detection unit attached to the foam body, and a surface material affixed to a surface to which at least the insert material is attached. A manufacturing method includes: preparing a pair of molds including a first mold and a second mold; affixing an insert material and a surface material together such that the surface material is in contact with a molding surface of the first mold; closing the pair of molds; injecting a foam resin into a molding space formed by closing the molds; foaming the foam resin to form a foam body; opening the pair of molds; and removing a molded product in which the affixed part and the foam body are integrated.

15 Claims, 32 Drawing Sheets

(56) References Cited

U.S. PATENT DOCUMENTS

2019/0275934 A1* 9/2019 Cho ..................... B60Q 3/217
2020/0338793 A1* 10/2020 Ito ..................... B29C 44/1271
2021/0170728 A1* 6/2021 Gerken ................. B60K 37/02

FOREIGN PATENT DOCUMENTS

| | | |
|---|---|---|
| EP | 1 249 369 | 10/2002 |
| EP | 1 935 604 | 6/2008 |
| JP | S56-50833 | 5/1981 |
| JP | 2007-106240 A | 4/2007 |
| JP | 2009-527377 | 7/2009 |
| JP | 2018-501135 | 1/2018 |
| WO | WO 2004/069578 | 8/2004 |

* cited by examiner

A-A CROSS-SECTION

A-A CROSS-SECTION

FIG. 20A
FIG. 20C
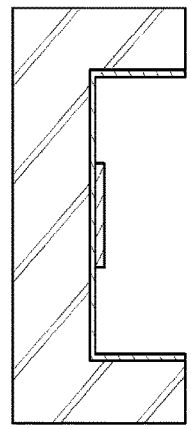
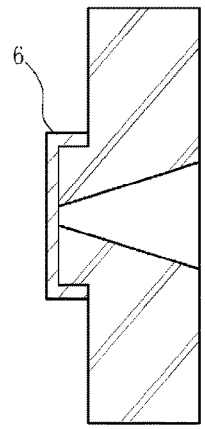
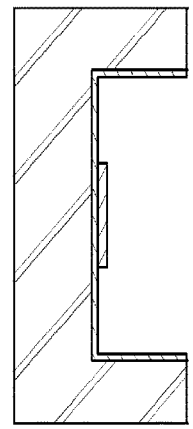
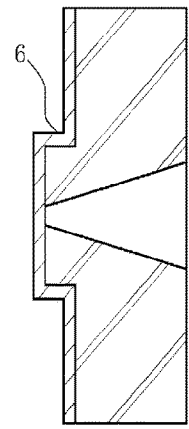
FIG. 20B
FIG. 20D
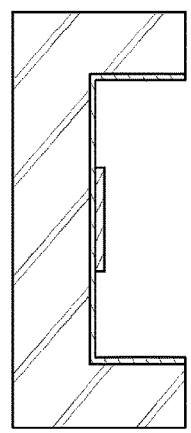
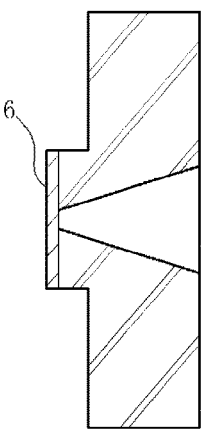
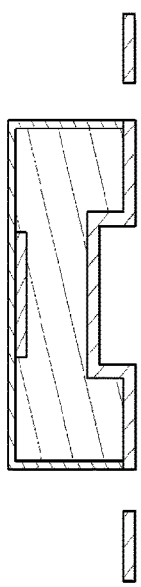

FOAM MOLDED PRODUCT AND MANUFACTURING METHOD THEREFOR

CROSS REFERENCE TO RELATED APPLICATIONS

This application is a 371 National Stage Application, which claims the benefit of International Application No. PCT/JP2019/012309, filed on Mar. 25, 2019, which claims priority to Japanese Patent Application No. 2018-098797, filed on May 23, 2018, the contents of which are hereby incorporated by reference in their entirety.

TECHNICAL FIELD

The present disclosure relates to a foam molded product and a method for manufacturing the same.

BACKGROUND

A resin molded product in which a touch sensor is mounted is used in an interior part of an automobile (for example, an instrument panel), an operating panel for a household appliance, or the like. For example, with reference to Japan Unexamined Patent Publication No. 2018-501135, such a molded product can be obtained by arranging a surface material 101 and a touch sensor 102 in the cited order on a molding surface of one of a pair of molds 103, 103 (FIG. 32A), closing the molds (FIG. 32B), and injecting a molten resin such as a thermoplastic resin into a molding space for integrally molding (FIG. 32C). In other words, the molded product can be manufactured by so-called insert molding using a touch sensor as an insert material. In such a manufacturing method, a molded product 100 including the touch sensor decorated with the surface material 101 can be obtained by one injection molding.

However, the molded product obtained by the known manufacturing method has a hard resin on the back side of the insert material; therefore, when the insert material part is touched, the hard texture of the resin molded product may be transmitted to a finger as is. In addition, the known manufacturing method is injection molding, and an excessive load that is likely to cause a damage of the insert material may be applied to the insert material depending on pressure and temperature of the resin during molding.

SUMMARY

The present disclosure provides a foam molded product from which the soft texture as a whole including the location of an insert material can be obtained and a manufacturing method for producing the foam molded product. Further, the present disclosure provides a manufacturing method in which an excessive load is not applied to the insert material.

Some aspects are described below. These aspects can be combined optionally, as needed.

A foam molded product according to an aspect of the present disclosure includes: a foam body; an insert material including at least one of a display unit and a detection unit attached to the foam body; and a surface material affixed to a surface to which at least the insert material is attached.

The foam molded product may further include a flexible layer disposed between the insert material and the surface material and on the surface to which at least the insert material is attached.

The foam molded product may further include a base substrate disposed on an opposite surface from the surface to which the insert material of the foam body is attached.

The insert material may include a wiring member having a length protruding from a parting line of the foam molded product, and the foam molded product may further include a soft seal material formed around the parting line.

The insert material may include a wiring member having a length protruding through a through-hole formed in the foam body and the base substrate to the back side of the foam molded product, and the foam molded product may further include a soft seal material formed inside the through-hole.

The detection unit included in the insert material may be a touch sensor, and the touch sensor may be mounted such that a detecting surface is exposed on the face of the foam body.

The surface material may have light transparency, and the foam molded product may further include a light source disposed on a back surface of the surface material or the touch sensor.

The detection unit included in the insert material may be a tact switch, and the tact switch may be mounted such that a pressing surface is exposed on the face of the foam body.

The surface material may have light transparency. The display unit included in the insert material may be a laminate of a label having a transmissive display portion and a light source, and the label may be attached to be exposed on the face of the foam body.

The surface material may have light transparency. The display unit included in the insert material may be a dot matrix display device, and the dot matrix display device may be mounted such that a display surface is exposed on the face of the foam body.

A method for manufacturing a foam molded product according to an aspect of the present disclosure includes: an affixed part arrangement step of preparing a pair of molds including a first mold and a second mold, and arranging an affixed part in which an insert material including at least one of a display unit and a detection unit and a surface material are affixed together such that the surface material is in contact with a molding surface of the first mold; a mold closing step of closing the pair of molds; a molding step of injecting a foam resin into a molding space formed by closing the molds, and foaming the foam resin to form a foam body; a mold opening step of opening the pair of molds; and a removal step of removing a molded product in which the affixed part and the foam body are integrated.

In the affixed part, a flexible layer may be affixed between the insert material and the surface material.

A method for manufacturing a foam molded product according to an aspect of the present disclosure includes: a surface material arrangement step of preparing a pair of molds including a first mold and a second mold, and arranging a surface material on a molding surface of the first mold; an insert material arrangement step of arranging an insert material including at least one of a display unit and a detection unit on one surface of the surface material opposite from the other surface of the surface material being in contact with the molding surface; a mold closing step of closing the pair of molds; a molding step of injecting a foam resin into a molding space formed by closing the molds, and foaming the foam resin to form a foam body; a mold opening step of opening the pair of molds; and a removal step of removing a molded product in which the surface material, the insert material, and the foam body are integrated.

The method for manufacturing the foam molded product may further include a flexible layer arrangement step of arranging a flexible layer between the surface material and the insert material.

The method for manufacturing the foam molded product may further include a base substrate arrangement step of arranging a base substrate on a molding surface of the second mold before the mold closing step.

The insert material may include a wiring member having a length protruding to a parting surface of the first mold, and a soft seal material may be formed on at least one of the parting surface of the first mold and a parting surface of the second mold.

A method for manufacturing a foam molded product according to an aspect of the present disclosure includes: an insert material arrangement step of preparing a pair of molds including a first mold and a second mold, and arranging an insert material including at least one of a display unit and a detection unit on a molding surface of the first mold; a mold closing step of closing the pair of molds; a molding step of injecting a foam resin into a molding space formed by closing the molds, and foaming the foam resin to form a foam body; a mold opening step of opening the pair of molds; and a removal step of removing a molded product in which the insert material and the foam body are integrated.

A method for manufacturing a foam molded product according to an aspect of the present disclosure includes: an insert material arrangement step of preparing a pair of molds including a first mold and a second mold, and arranging an insert material including at least one of a display unit and a detection unit on a molding surface of the first mold; a base substrate arrangement step of arranging a base substrate on a molding surface of the second mold; a mold closing step of closing the pair of molds; a molding step of injecting a foam resin into a molding space formed by closing the molds, and foaming the foam resin to form a foam body; a mold opening step of opening the pair of molds; and a removal step of removing a molded product in which the insert material, the base substrate, and the foam body are integrated.

A method for manufacturing a foam molded product according to an aspect of the present disclosure includes: an insert material arrangement step of preparing a pair of molds including a first mold and a second mold, and arranging an insert material including at least one of a display unit and a detection unit on a molding surface of the first mold; a base substrate arrangement step of arranging a base substrate on a molding surface of the second mold; a mold closing step of closing the pair of molds; a molding step of injecting a foam resin into a molding space formed by closing the molds, and foaming the foam resin to form a foam body; a mold opening step of opening the pair of molds; a removal step of removing a molded product in which the insert material, the base substrate, and the foam body are integrated; and an affixing step of affixing a surface material to the molded product such that the surface material covers the insert material.

A method for manufacturing a foam molded product according to an aspect of the present disclosure includes: a base substrate arrangement step of preparing a pair of mold including a first mold having a molding surface with a protruded portion that has the same size in planar view as an insert material including at least one of a display unit and a detection unit, and a second mold, and arranging a base substrate on a molding surface of the second mold; a mold closing step of closing the pair of molds; a molding step of injecting a foam resin into a molding space formed by closing the molds, and foaming the foam resin to form a foam body including a recessed portion formed by the protruded portion of the first mold; a mold opening step of opening the pair of molds; a removal step of removing a molded product in which the base substrate and the foam body are integrated; and an affixing step of affixing a surface material affixed with the insert material to the molded product such that the insert material is fitted into the recessed portion.

A method for manufacturing a foam molded product according to an aspect of the present disclosure includes: a base substrate arrangement step of preparing a pair of mold including a first mold having a molding surface with a protruded portion that has the same size in planar view as an insert material including at least one of a display unit and a detection unit, and a second mold, and arranging a base substrate on a molding surface of the second mold; a mold closing step of closing the pair of molds; a molding step of injecting a foam resin into a molding space formed by closing the molds, and foaming the foam resin to form a foam body including a recessed portion formed by the protruded portion of the first mold; a mold opening step of opening the pair of molds; a removal step of removing a molded product in which the base substrate and the foam body are integrated; an insert material attachment step of attaching an insert material to the recessed portion such that at least one of a display surface of the display unit and a detecting surface of the detection unit is exposed; and an affixing step of affixing a surface material to the molded product such that the surface material covers the insert material.

In the aforementioned method for manufacturing the foam molded product according to each of the aspects, the detection unit included in the insert material may be a touch sensor or a tact switch.

Additionally, in the aforementioned method for manufacturing the foam molded product according to each of the aspects, the surface material may have light transparency, and the display unit included in the insert material may be a laminate of a label having a transmissive display portion and a light source, or a dot matrix display device.

The foam molded product according to an aspect of the present disclosure is configured to include: a foam body; an insert material including at least one of a display unit and a detection unit attached to the foam body; and a surface material affixed to a surface to which at least the insert material is attached.

Accordingly, the foam molded product according to an aspect of the present disclosure is configured such that the foam body is formed on the back side of the insert material. Therefore, the soft texture as a whole including the location of the insert material can be obtained.

A method for manufacturing a foam molded product according to an aspect of the present disclosure is configured to include: an affixed part arrangement step of preparing a pair of molds including a first mold and a second mold, and arranging an affixed part in which an insert material including at least one of a display unit and a detection unit and a surface material are affixed together such that the surface material is in contact with a molding surface of the first mold; a mold closing step of closing the pair of molds; a molding step of injecting a foam resin into a molding space formed by closing the molds, and foaming the foam resin to form a foam body; a mold opening step of opening the pair of molds; and a removal step of removing a molded product in which the affixed part and the foam body are integrated.

Further, a method for manufacturing a foam molded product according to an aspect of the present disclosure is configured to include: a surface material arrangement step of preparing a pair of molds including a first mold and a second mold, and arranging a surface material on a molding surface of the first mold; an insert material arrangement step of arranging an insert material including at least one of a display unit and a detection unit on one surface of the surface material opposite from the other surface of the surface material being in contact with the molding surface; a mold closing step of closing the pair of molds; a molding step of injecting a foam resin into a molding space formed by closing the molds, and foaming the foam resin to form a foam body; a mold opening step of opening the pair of molds; and a removal step of removing a molded product in which the surface material, the insert material, and the foam body are integrated.

Furthermore, a method for manufacturing a foam molded product according to an aspect of the present disclosure is configured to include: an insert material arrangement step of preparing a pair of molds including a first mold and a second mold, and arranging an insert material including at least one of a display unit and a detection unit on a molding surface of the first mold; a mold closing step of closing the pair of molds; a molding step of injecting a foam resin into a molding space formed by closing the molds, and foaming the foam resin to form a foam body; a mold opening step of opening the pair of molds; and a removal step of removing a molded product in which the insert material and the foam body are integrated.

In addition, a method for manufacturing a foam molded product according to an aspect of the present disclosure is configured to include: an insert material arrangement step of preparing a pair of molds including a first mold and a second mold, and arranging an insert material including at least one of a display unit and a detection unit on a molding surface of the first mold; a base substrate arrangement step of arranging a base substrate on a molding surface of the second mold; a mold closing step of closing the pair of molds; a molding step of injecting a foam resin into a molding space formed by closing the molds, and foaming the foam resin to form a foam body; a mold opening step of opening the pair of molds; and a removal step of removing a molded product in which the insert material, the base substrate, and the foam body are integrated.

Moreover, a method for manufacturing a foam molded product according to an aspect of the present disclosure is configured to include: an insert material arrangement step of preparing a pair of molds including a first mold and a second mold, and arranging an insert material including at least one of a display unit and a detection unit on a molding surface of the first mold; a base substrate arrangement step of arranging a base substrate on a molding surface of the second mold; a mold closing step of closing the pair of molds; a molding step of injecting a foam resin into a molding space formed by closing the molds, and foaming the foam resin to form a foam body; a mold opening step of opening the pair of molds; a removal step of removing a molded product in which the insert material, the base substrate, and the foam body are integrated; and an affixing step of affixing a surface material to the molded product such that the surface material covers the insert material.

Thus, according to the aforementioned two methods for manufacturing the foam molded product, the foam body is formed on the back side of the insert material. Therefore, the soft texture as a whole including the location of the insert material can be obtained. In addition, since the foam resin is injected and foamed, an excessive load is not applied to the insert material.

Further, a method for manufacturing a foam molded product according to an aspect of the present disclosure is configured to include: a base substrate arrangement step of preparing a pair of mold including a first mold having a molding surface with a protruded portion that has the same size in planar view as an insert material including at least one of a display unit and a detection unit, and a second mold, and arranging a base substrate on a molding surface of the second mold; a mold closing step of closing the pair of molds; a molding step of injecting a foam resin into a molding space formed by closing the molds, and foaming the foam resin to form a foam body including a recessed portion formed by the protruded portion of the first mold; a mold opening step of opening the pair of molds; a removal step of removing a molded product in which the base substrate and the foam body are integrated; and an affixing step of affixing a surface material affixed with the insert material to the molded product such that the insert material is fitted into the recessed portion.

Furthermore, a method for manufacturing a foam molded product according to an aspect of the present disclosure is configured to include: a base substrate arrangement step of preparing a pair of mold including a first mold having a molding surface with a protruded portion that has the same size in planar view as an insert material including at least one of a display unit and a detection unit, and a second mold, and arranging a base substrate on a molding surface of the second mold; a mold closing step of closing the pair of molds; a molding step of injecting a foam resin into a molding space formed by closing the molds, and foaming the foam resin to form a foam body including a recessed portion formed by the protruded portion of the first mold; a mold opening step of opening the pair of molds; a removal step of removing a molded product in which the base substrate and the foam body are integrated; an insert material attachment step of attaching an insert material to the recessed portion such that at least one of a display surface of the display unit and a detecting surface of the detection unit is exposed; and an affixing step of affixing a surface material to the molded product such that the surface material covers the insert material.

Thus, according to the aforementioned two methods for manufacturing the foam molded product, the foam body is formed on the back side of the insert material. Therefore, the soft texture as a whole including the location of the insert material can be obtained. In addition, the foam body is molded, and thereafter the insert material is attached to the foam body. Therefore, an excessive load is not applied to the insert material.

BRIEF DESCRIPTION OF DRAWINGS

FIGS. 2A to 3C are schematic cross-sectional views illustrating a foam molded product according to another embodiment of the present disclosure.

FIGS. 3A to 3C are schematic cross-sectional views illustrating a foam molded product according to yet another embodiment of the present disclosure.

FIGS. 20A to 20D are schematic cross-sectional views illustrating a method for manufacturing a foam molded product according to another embodiment of the present disclosure.

DETAILED DESCRIPTION

An example of a foam molded product and a manufacturing method therefor according to an embodiment of the present disclosure will be described with reference to the drawings.

Figure 1A:
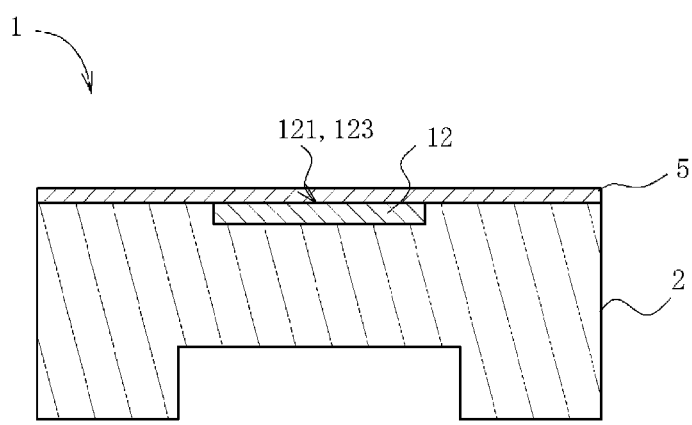
FIGS. 1A to 1C are schematic cross-sectional views illustrating a foam molded product according to an embodiment of the present disclosure.
Figure 1B:
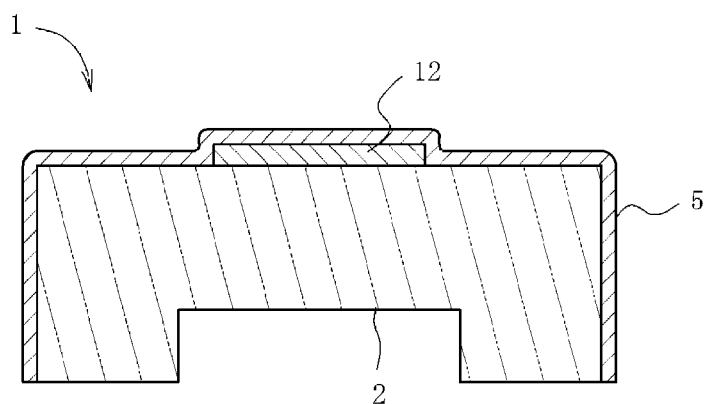
Figure 1C:
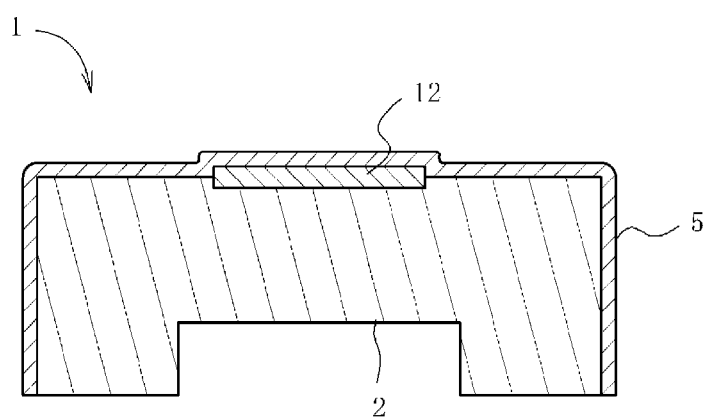

A foam molded product 1 according to an embodiment of the present disclosure includes a foam body 2, an insert material 12 including at least one of a display unit and a detection unit attached to the foam body 2, and a surface material 5 affixed to a surface to which at least the insert material 12 is attached (see FIGS. 1A to 1C).

The foam body 2 is a molded body made of a resin and a foaming agent. The resin is not particularly limited, and a thermoplastic resin, a thermosetting resin, or the like can be applied as the resin. For example, a urethane resin, a vinyl chloride resin, an olefin resin, a styrene-based resin, a silicon-based resin, or the like is applied as the resin. Of the resins, a soft resin such as a urethane resin is preferably applied, because more flexibility can be provided by the foam body 2. Air bubbles contained in the foam body 2 may be interconnected cells or may be closed cells. The foam body 2 made of the resin as described above is also formed on the back side of the insert material 12. Thus, when the insert material 12 is touched by a user, the user may feel with a finger the soft texture as a whole including the insert material 12.

(Insert Material)

The insert material 12 may include both a display unit and a detection unit or may include any of the display unit and the detection unit. The display unit includes a display surface 121, and the detection unit includes a detecting surface 123. For example, icons such as graphics, numbers, symbols, or the like, static images, and videos are displayed on the display surface 121. The detection unit detects, for example, force, distance, heat, light, sound, smell, or the like via the detecting surface 123.

The insert material 12 is mounted such that at least one of the display surface 121 and the detecting surface 123 is exposed on the face of the foam body 2. For example, the configuration in which a step is substantially absent between the face of the foam body 2 and the detecting surface 123 (see FIG. 1A), the configuration in which the insert material 12 is layered on the face of the foam body 2 (see FIG. 1B), or the configuration in which the insert material 12 is slightly protruded from the face of the foam body 2 (see FIG. 1C) can be provided. The insert material 12 can be attached, for example, by affixing the insert material to the face of the foam body 2, placing the insert material on the face of the foam body 2, or fitting the insert material into the foam body 2.

The surface material 5 is affixed to the surface to which at least the insert material 12 is attached. Thus, the surface material may be affixed only to the surface to which the insert material 12 is attached as in FIG. 1A or may be affixed to the surface to which the insert material 12 is attached, and to the side surfaces of the foam body 2 as illustrated in FIGS. 1B and 1C. For example, a vinyl chloride resin, an elastomer resin, a polyurethane resin, an olefin-based resin, a polyester resin, a silicon-based resin, a natural leather, a synthetic leather, an artificial leather, a non-woven fabric, various fabrics, or the like can be applied as a material of the surface material 5. A surface material molded by a known method such as slurry molding or vacuum molding is applied as the surface material 5. The surface material 5 is affixed, for example, via an adhesive, adhesive tape, or the like.

Figure 2A:
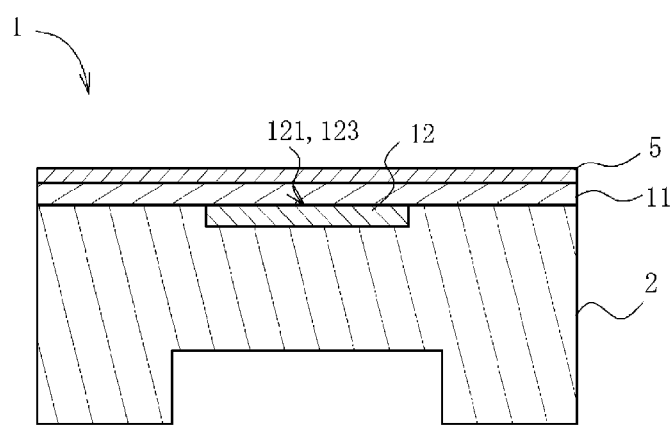
Figure 2B:
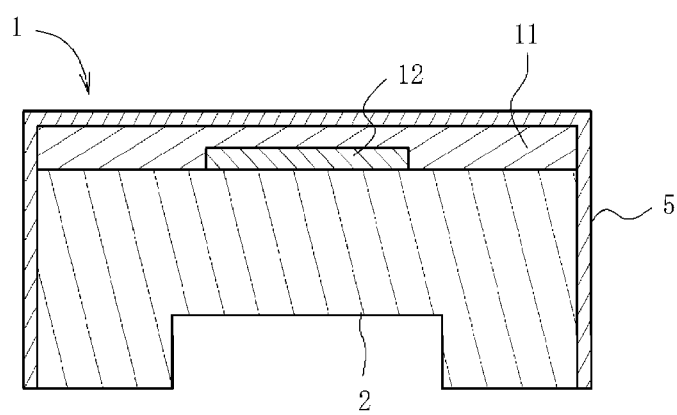
Figure 2C:
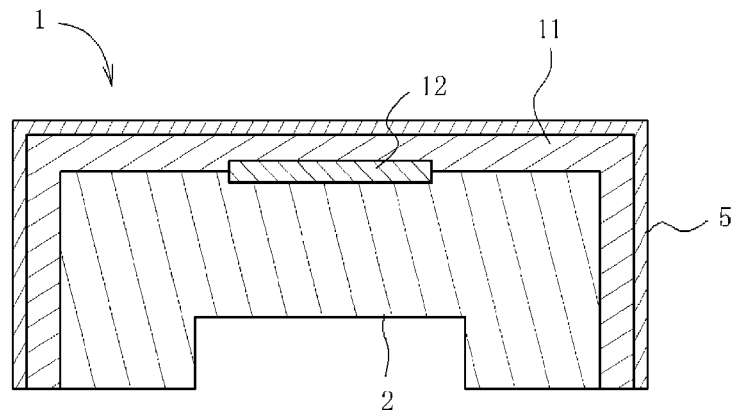

The foam molded product 1 may further include a flexible layer 11 disposed between the insert material 12 and the surface material 5 and on the surface to which at least the insert material 12 is attached (see FIGS. 2A to 2C). For example, a flexible resin such as an elastomer resin, a gel, a foam resin obtained by foaming the same resin as the foam body 2, or the like can be applied as the flexible layer 11. As with the surface material 5, the flexible layer 11 may be formed on only the surface to which the insert material 12 is attached (see FIGS. 2A and 2B) or may be formed on the surface to which the insert material 12 is attached, and on the side surfaces of the foam body 2 (see FIG. 2C). Since the flexible layer 11 is formed on the display surface 121 of the insert material 12 or the detecting surface 123 of the insert material 12, the insert material 12 is surrounded by a soft material such as the foam body 2 and the flexible layer 11. Therefore, when the location of the insert material 12 is touched by a user, the user may feel with a finger the softer texture as a whole including the location of the insert material 12.

Figure 3A:
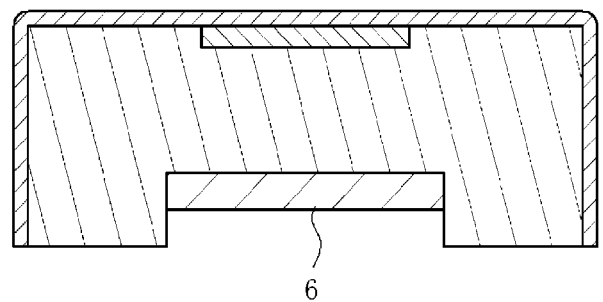
Figure 3B:
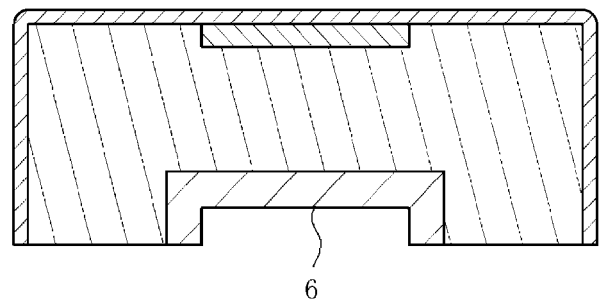
Figure 3C:
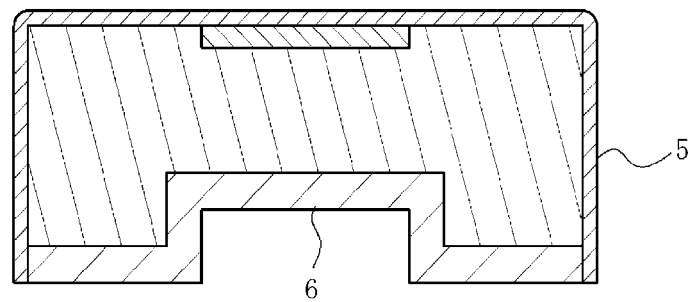

The foam molded product 1 may further include a base substrate 6 on an opposite surface from the surface of the foam body 2 to which the insert material 12 is attached (see FIGS. 3A to 3C). The foam molded product includes the base substrate 6, and thus the rigidity, strength, and attachability of the foam molded product are improved. For example, a polypropylene resin, an ABS resin, a polycarbonate resin, a nylon resin, a silicon resin, a polybutylene terephthalate resin, a fiber reinforced resin, metal (aluminum, steel, or the like), a natural wood, or the like can be applied as the base substrate 6. The surface to which the insert material 12 is attached is the face of the foam body 2; therefore, the base substrate 6 is formed on the back side of the foam body 2. The base substrate 6 may be formed on a portion of the back side of the foam body 2 (see FIGS. 3A and 3B) or may be formed to cover the back side of the foam body 2 (see FIG. 3C). Note that, as illustrated in FIG. 3C, the surface material 5 may be affixed extending over an area from the foam body 2 to the base substrate 6.

Additionally, the insert material 12 may include a wiring member 4 having a length protruding from a parting line PL of the foam molded product 1, and the foam molded product 1 may further include a soft seal material 7 formed around the parting line PL (see FIGS. 4B and 4C and FIGS. 5B and 5C).

Figure 4A:
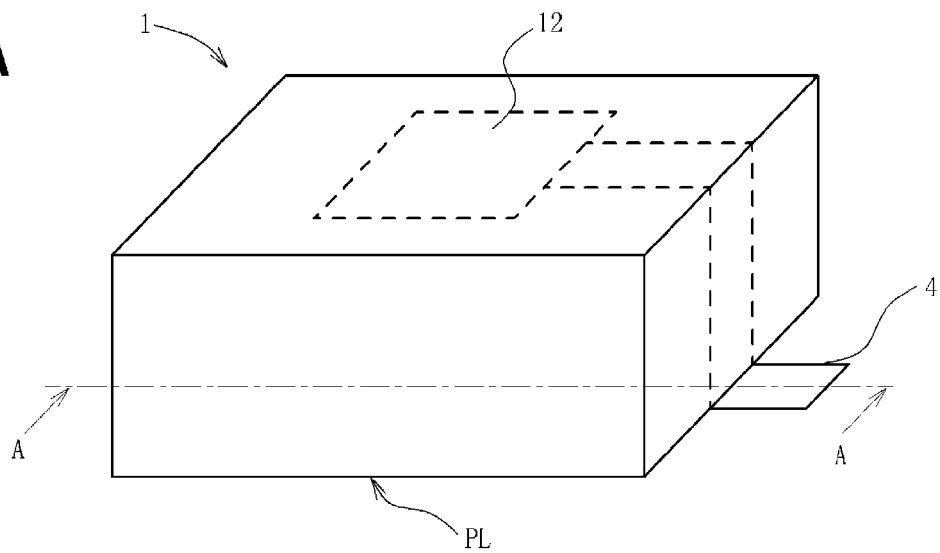
FIG. 4A is a schematic perspective view illustrating a foam molded product according to another embodiment of the present disclosure.
Figure 4B:
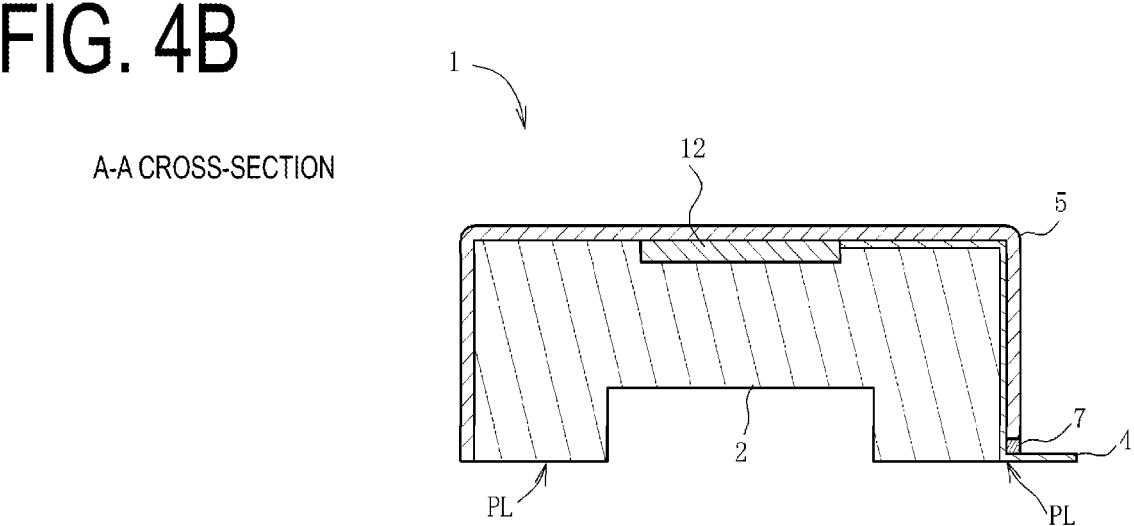
FIG. 4B is an A-A cross-sectional view of FIG. 4A.
Figure 4C:
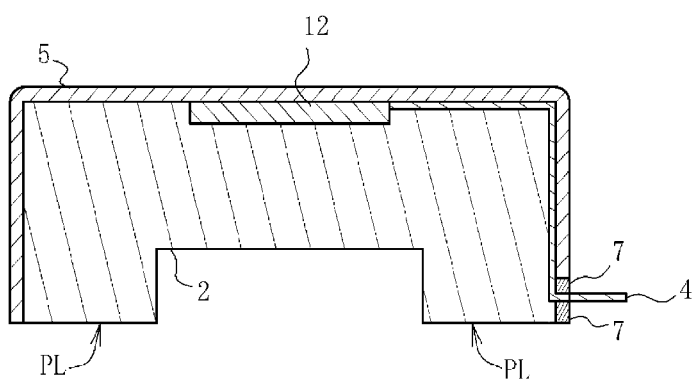
FIG. 4C is a schematic cross-sectional view illustrating a foam molded product according to yet another embodiment of the present disclosure.
Figure 5A:
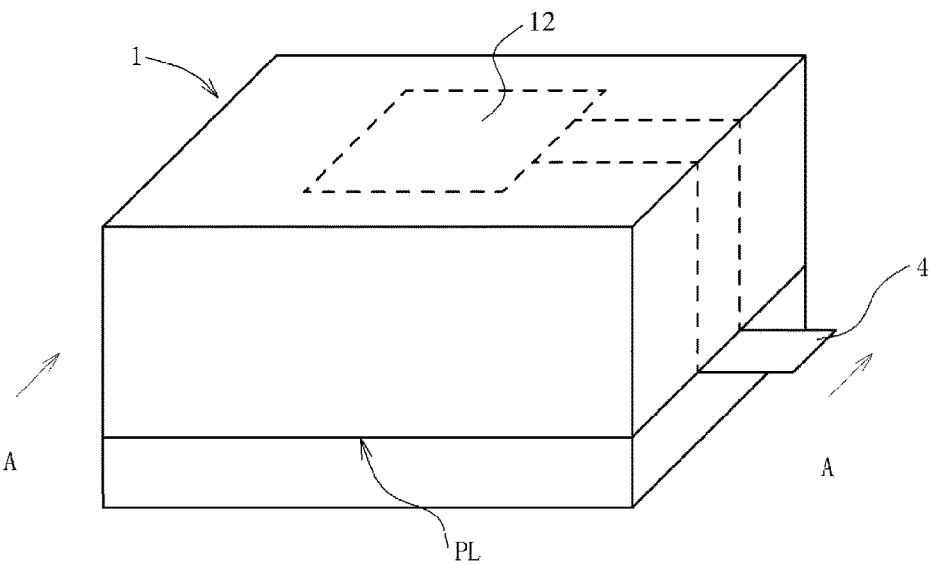
FIG. 5A is a schematic perspective view illustrating a foam molded product according to another embodiment of the present disclosure.
Figure 5B:
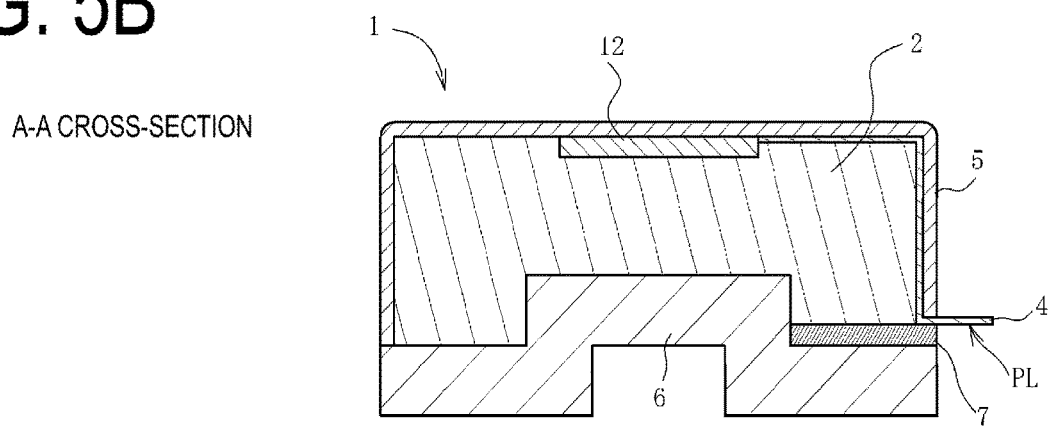
FIG. 5B is an A-A cross-sectional view of FIG. 5A.
Figure 5C:
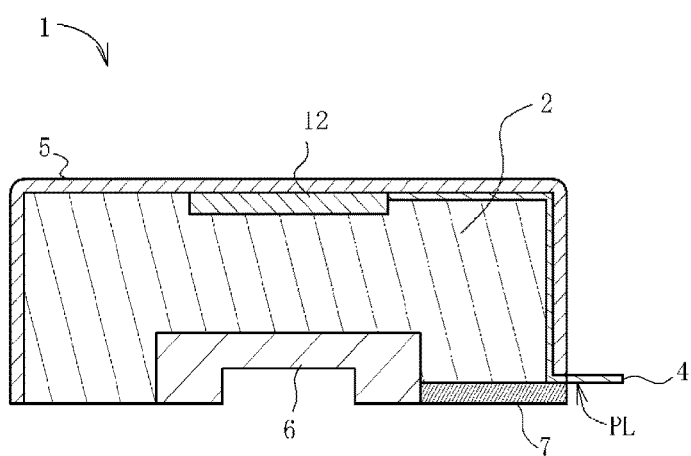
FIG. 5C is a schematic cross-sectional view illustrating a foam molded article according to yet another embodiment of the present disclosure.

The insert material 12 includes the wiring member 4 electrically connected to an electrode included in at least one of the display unit and the detection unit. For example, a printed circuit board (FPC) is applied as the wiring member. Since the wiring member 4 has the length protruding from the parting line PL of the foam molded product 1, an external electronic device can be connected to the protruded portion of the wiring. The foam molded product 1 includes the soft seal material 7 formed around the parting line PL. Note that the area around the parting line PL includes a structure where the soft seal material 7 is formed in contact with the parting line PL when viewed in cross-section and a structure where the soft seal material 7 is formed in the vicinity of the parting line PL (a structure where the soft seal material 7 is also formed on the wiring member 4 as illustrated in FIGS. 4B and 4C). For example, a urethane resin, an elastomer resin, a vinyl chloride resin, an olefin-based resin, a styrene-based resin, a silicon-based resin, or the like can be applied as the soft seal material 7.

Figure 6A:
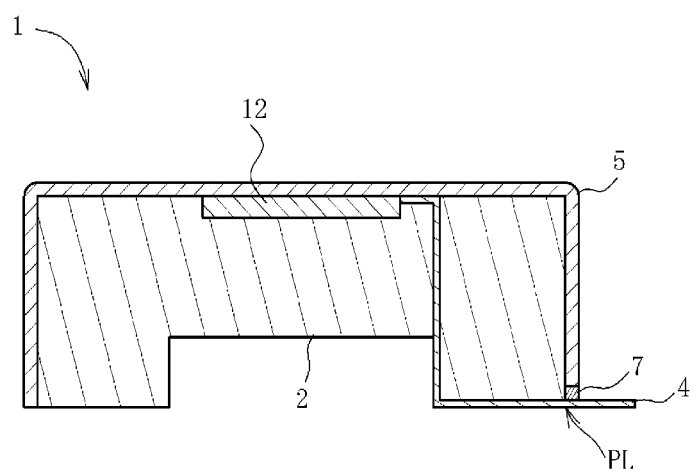
FIGS. 6A and 6B are schematic cross-sectional views illustrating a foam molded product according to another embodiment of the present disclosure.
Figure 6B:
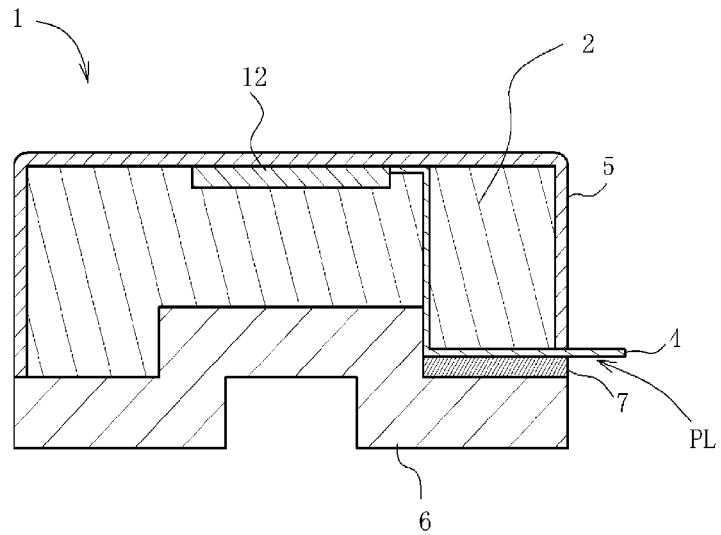

Note that the wiring member 4 may protrude from the parting line PL through the inside of the foam body 2 (see FIGS. 6A and 6B).

In such a foam molded product 1, the soft seal material 7 is formed in contact with the wiring member 4 protruding from the parting line PL. Therefore, at the time of mounting the foam molded product 1, the soft seal material 7 serves as a cushion and thus can prevent breaking of wire.

Figure 7A:
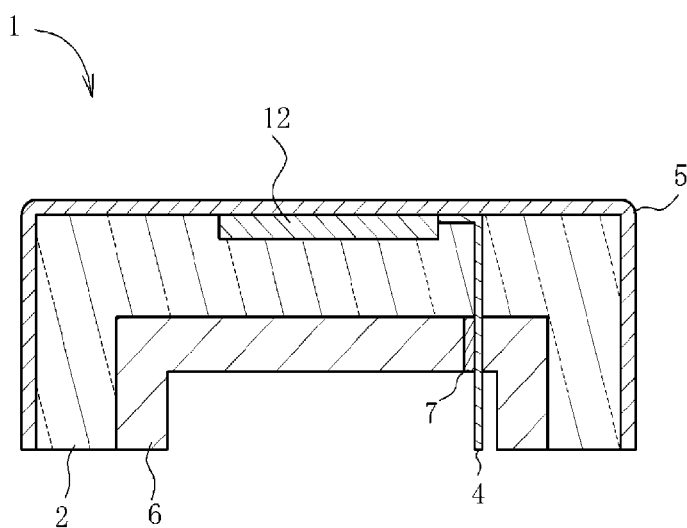
FIGS. 7A and 7B are schematic cross-sectional views illustrating a foam molded product according to yet another embodiment of the present disclosure.
Figure 7B:
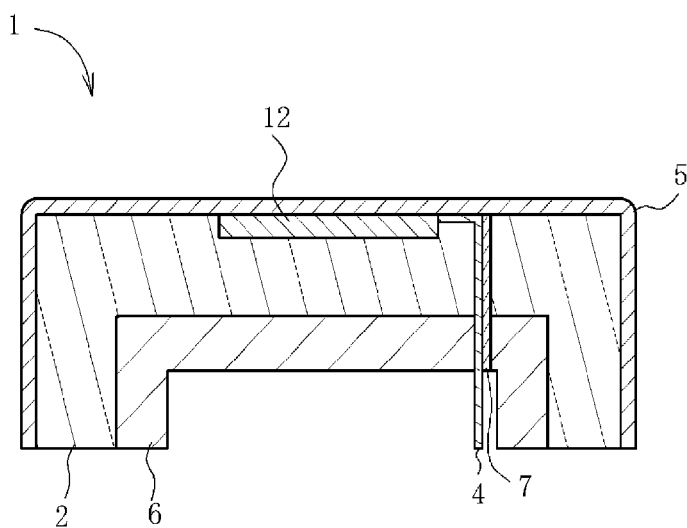

Additionally, the insert material 12 may include the wiring member 4 having a length protruding to the back side of the foam molded product 1 through a through-hole formed in the foam body 2 and the base substrate 6, and the foam molded product 1 may further include the soft seal material 7 formed inside the through-hole (see FIGS. 7A and 7B).

The through-hole is formed in the foam body 2 and the base substrate 6; however, the soft seal material 7 may be formed only inside the through-hole of the base substrate 6 (see FIG. 7A) or may be formed inside the through-hole of both the foam body 2 and the base substrate 6 (see FIG. 7B).

The foam molded product 1 can be obtained, for example, by integrating the foam body 2 and the base substrate 6 to form the through-hole, passing the wiring member 4 of the insert material 12 through the through-hole, forming the soft seal material 7 inside the through-hole, and affixing the surface material 5.

In the foam molded product 1 configured as just described, the wiring member 4 is hidden below the back side of the foam molded product 1; therefore, the appearance of the foam molded product 1 can be improved. In addition, the soft seal material 7 is formed in contact with the wiring member 4. Accordingly, the soft seal material 7 serves as a cushion at the time of mounting the foam molded product 1 and thus can prevent breaking of wire.

(Touch Sensor)

Figure 8A:
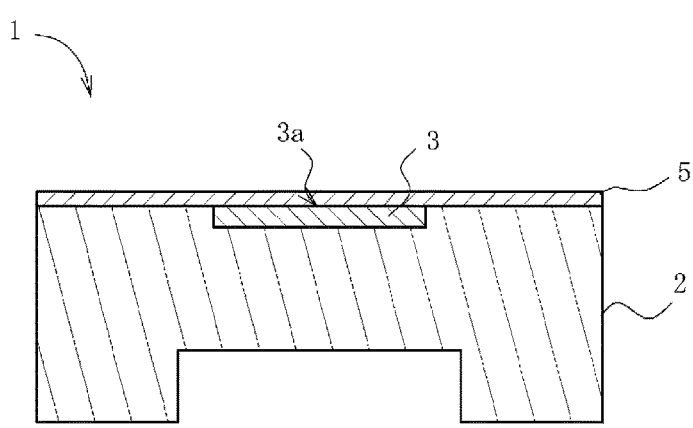
FIGS. 8A to 8C are schematic cross-sectional views illustrating a foam molded product using a touch sensor according to an embodiment of the present disclosure.
Figure 8B:
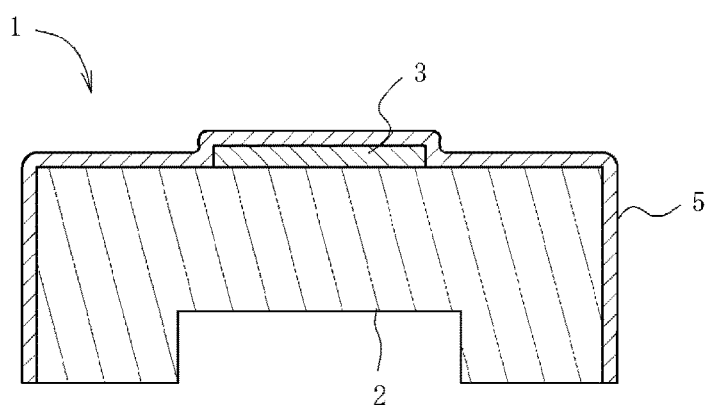
Figure 8C:
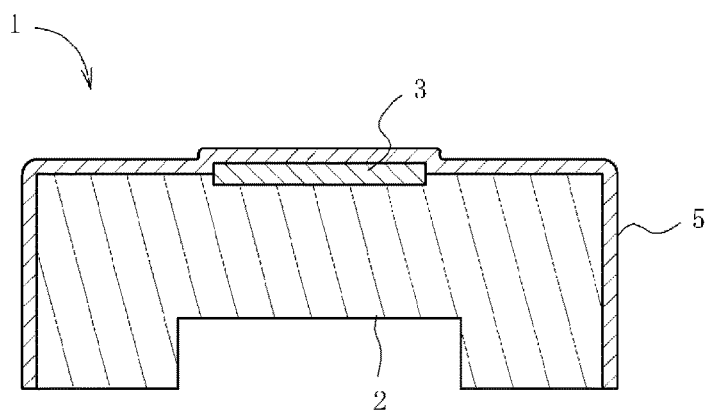

The detection unit included in the insert material 12 of the foam molded product 1 is a touch sensor 3, and the touch sensor 3 may be mounted such that a detecting surface 3a is exposed on the face of the foam body 2 (see FIGS. 8A to 8C).

A touch sensor that operates in a known sensing method such as a capacitive sensing method, a pressure-sensitive method, or a resistive film method may be applied as the touch sensor 3. A touch sensor including film, glass, or the like as a base substrate may be applied as the touch sensor 3; however, with the touch sensor 3 formed of a film base substrate and having a small thickness, a foam molded product having a softer texture can be obtained. The touch sensor 3 is mounted such that the detecting surface 3a is exposed on the face of the foam body 2. As long as the detecting surface 3a may be exposed on the face of the foam body 2, for example, the configuration in which no step is basically present between the face of the foam body 2 and the detecting surface 3a (see FIG. 8A), the configuration in which the touch sensor 3 is layered on the face of the foam body 2 (see FIG. 8B), or the configuration in which the touch sensor 3 is slightly protruded from the face of the foam body 2 (see FIG. 8C) can be provided. The touch sensor 3 can be attached in a manner, for example, by affixing the touch sensor to the face of the foam body 2, placing the touch sensor on the face of the foam body 2, fitting the touch sensor into the foam body 2. The surface material 5 is preferably affixed by using, for example, optical adhesive tape (Optical Clear Adhesive) so that optical properties of the touch sensor 3 are not impaired.

Figure 9A:
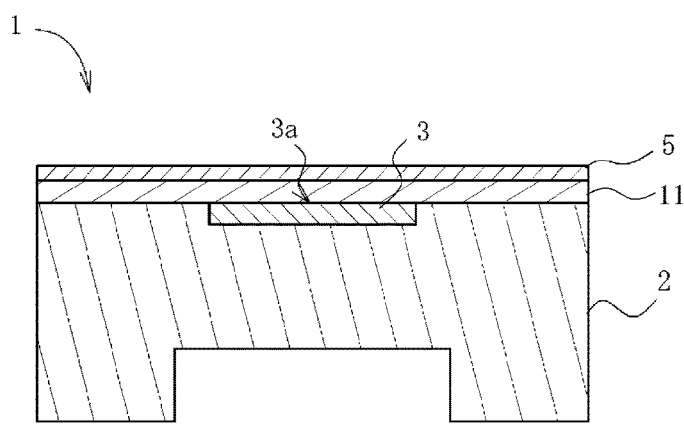
FIGS. 9A to 9C are schematic cross-sectional views illustrating a foam molded product using a touch sensor according to another embodiment of the present disclosure.
Figure 9B:
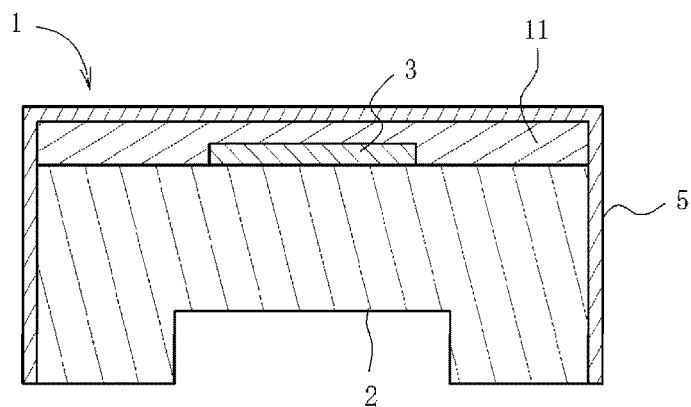
Figure 9C:
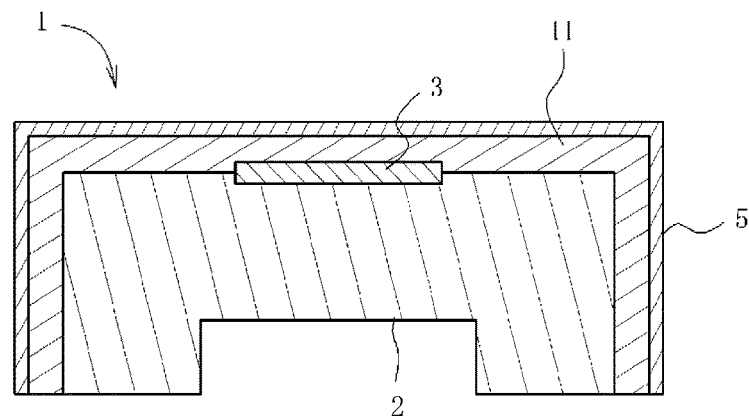

The flexible layer 11 may be provided between the touch sensor 3 and the surface material 5 (see FIGS. 9A to 9C).

The surface material 5 may have light transparency, and the foam molded product may further include a light source 8 on the back side of the surface material 5 or the touch sensor 3 (see FIGS. 10A to 10F). An example of the configuration of the surface material 5 having light transparency includes a configuration in which the surface material 5 is transparent or translucent (may be colored), a configuration in which an opening is provided in the surface material 5, and a configuration in which a portion of the surface material 5 has a small thickness. In a case where the foam molded product 1 is used, for example, as an operating panel (interior part) of an automobile, at least one of the aforementioned transparent portion or translucent portion, opening, and small-thickness portion is formed in the surface material, and thus any pattern (for example, an operation icon) can be formed. The light source 8 is turned on and thus can illuminate any pattern.

Figure 10A:
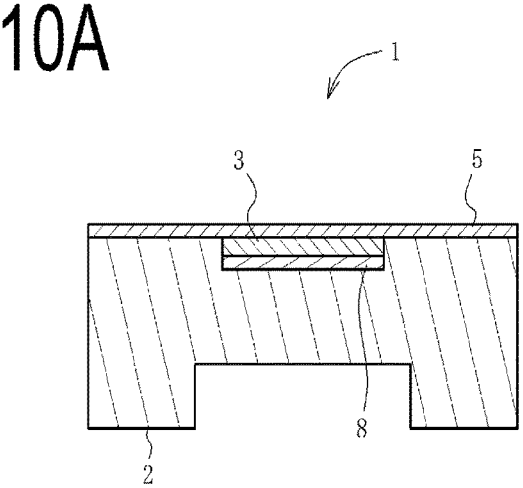
FIGS. 10A to 10F are schematic cross-sectional views illustrating an example of a foam molded product using a touch sensor and a light source according to an embodiment of the present disclosure.
Figure 10D:
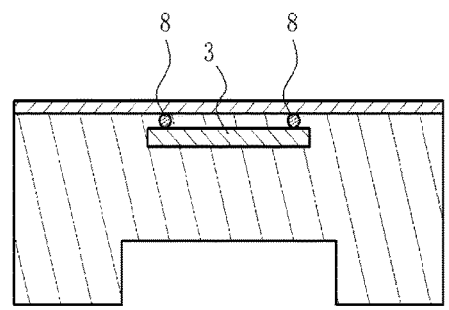
Figure 10B:
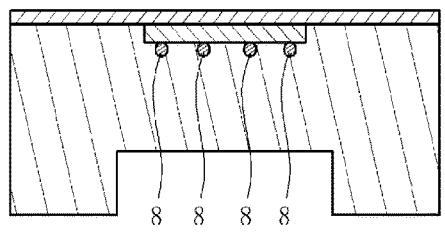
Figure 10E:
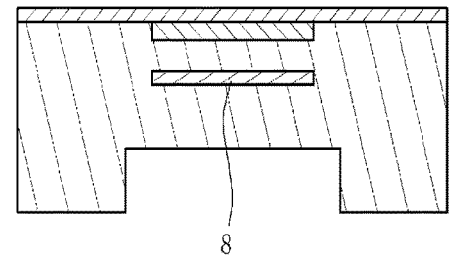
Figure 10C:
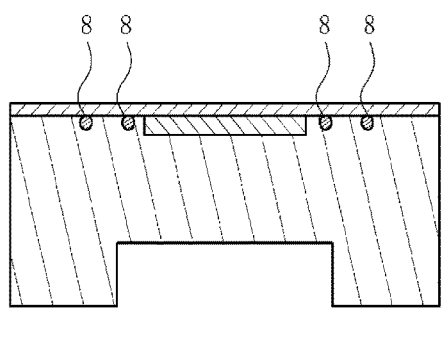
Figure 10F:
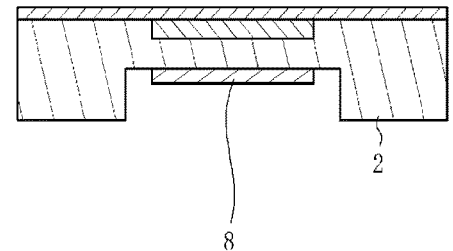

For example, LEDs (light emitting diodes), inorganic EL (electroluminescent), organic EL, or the like can be applied as the light source 8. The sheet-shaped light source 8 may be affixed to the back surface of the surface material 5 or the touch sensor 3 or may be mounted on the back surface of the surface material 5 or the touch sensor 3. In the case of mounting the light source 8, any pattern (such as letters, graphics, symbols, etc.) can be formed by the light sources 8 (see FIG. 10B). Such light sources are turned on, and thus any pattern can be displayed. Further, as in FIG. 10E, the light source 8 may be located on the back surface of the touch sensor 3 and separated from the touch sensor 3. Furthermore, as illustrated in FIG. 10F, the light source 8 may be placed on the back surface of the touch sensor 3 and on the back side of the foam molded product 1. In this case, the foam body 2 is also configured to have light transparency, and it is preferable that the thickness of a portion of the foam body 2 between the touch sensor 3 and the light source 8 is reduced.

In such a foam molded product 1, the touch sensor 3 and the surroundings thereof are illuminated by the light source 8; therefore, where to touch for operation is easily understandable for a user. In addition, the foam molded product is configured such that the operation icon is normally less-visible when the light source is turned off and that the operation icon is illuminated only when the touch sensor 3 is touched. Thus, a visual effect that the operation icon stands out from the operating panel can be attained.

Alternatively, the foam molded product 1 may be provided with the light source 8 and the surface material 5 without including the touch sensor 3.

(Tact Switch)

Figure 11A:
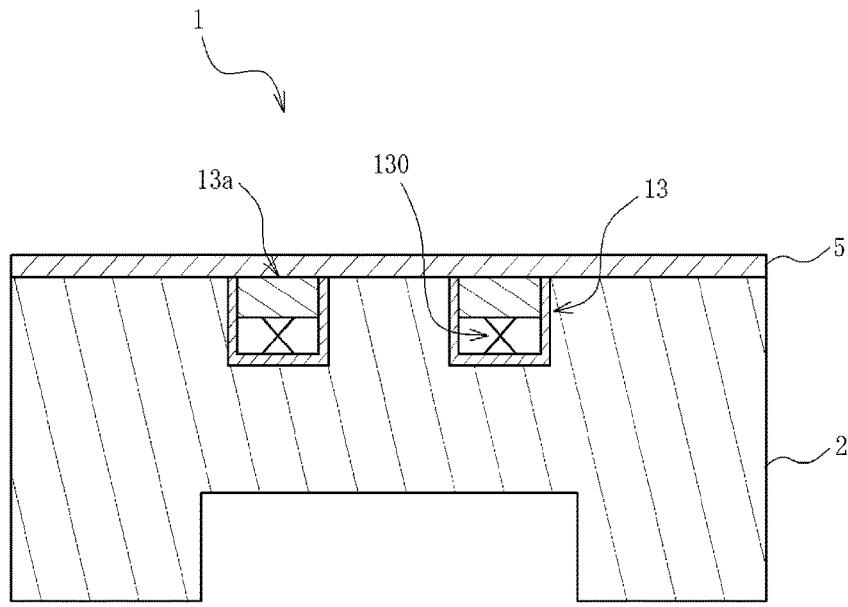
FIGS. 11A and 11B are schematic cross-sectional views illustrating an example of a foam molded product using a tact switch according to an embodiment of the present disclosure.

The detection unit included in the insert material 12 of the foam molded product 1 is a tact switch 13, and the tact switch 13 may be attached such that a pressing surface 13a is exposed on the face of the foam body 2 (see FIG. 11A). Here, the pressing surface 13a is an example of the detecting surface 123 that detects force.

The tact switch 13 is a component that is typically mounted on an electrical circuit (for example, a printed circuit board) and that is configured to convert the force applied to the pressing surface 13a to an electrical signal and input the signal to the circuit. In other words, a person presses the tact switch 13 to allow switching on/off of the electrical circuit. A known tact switch can be applied as the tact switch 13.

Figure 11B:
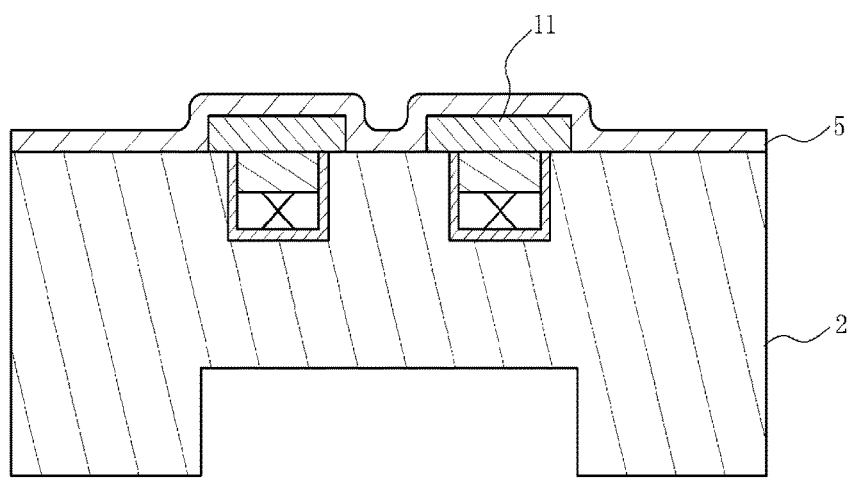

The tact switch 13 has an inversion spring 130 therein. Accordingly, when the switch is pressed, a click feeling is obtained. When pressing the switch, a user can feel in reality that the user has operated the switch. The flexible layer 11 may be provided between the tact switch 13 and the surface material 5 (see FIG. 11B). The flexible layer 11 may be provided on a portion of the surface to which the tact switch 13 is attached as illustrated in FIG. 11B, or may be provided on the whole surface to which the tact switch 13 is attached. In a case where the flexible layer is provided on a portion of the surface to which the tact switch is attached, as illustrated in FIG. 11B, a step is formed between a location where the tact switch 13 is present and a location other than the location including the tact switch 13. Therefore, a user can find the location including the tact switch 13 by simply touching the foam molded product 1. In a case where the flexible layer 11 is provided on the whole surface to which the tact switch is attached, a user can obtain a softer texture when touching any portion of the foam molded product 1.

Additionally, in particular, the foam molded product including the flexible layer 11 can be set such that the amount of pressing is 0.5 to 5 mm. Moreover, the load applied by a finger in the direction perpendicular to the molded product is preferably 1 to 10 N per 1 mm of the amount of pressing. With such a configuration, a good feeling of pressing can be obtained. In addition, the surface material 5 is preferably set such that the load at 10% modulus is 20N or smaller and that the load at 30% modulus is 60N or smaller. The JIS (Japanese Industrial Standard)-K7311 tensile test method is used as the method for measuring the load at 10% modulus and the load at 30% modulus. Specifically, the load at 10% elongation of a test piece is measured to be defined as a 10% modulus value, and the load at 30% elongation of a test piece is measured to be defined as a 30% modulus value. In a case where the surface material with such properties is applied, the surface material 5 easily follows when the tact switch 13 is pressed; therefore, a better operation feeling can be obtained.
(Laminate)

Figure 12:
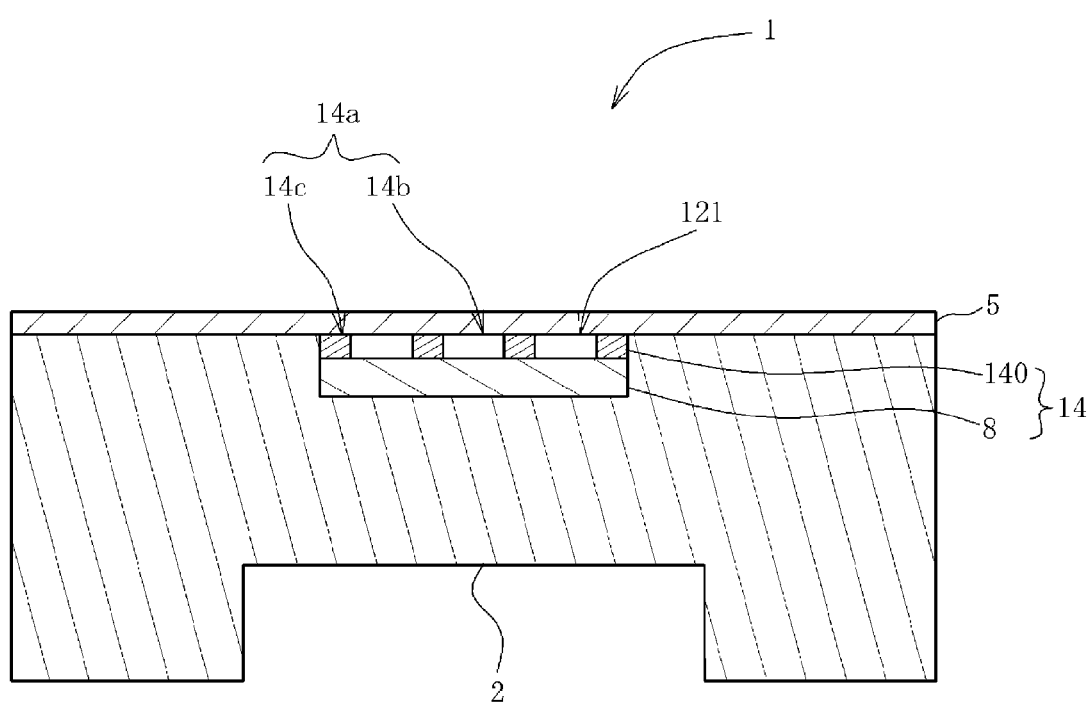
FIG. 12 is a schematic cross-sectional view illustrating a foam molded product using a laminate of a label and a light source according to an embodiment of the present disclosure.

The surface material 5 of the foam molded product 1 has light transparency, and the display unit included in the insert material 12 is a laminate 14 of the label 140 having a transmissive display portion 14*a* and the light source 8. The label 140 may be attached to be exposed on the face of the foam body 2 (see FIG. 12).

An example of the configuration in which the surface material 5 having light transparency includes a configuration in which the surface material 5 is transparent or translucent (may be colored), a configuration in which an opening is provided in the surface material 5, and a configuration in which a portion of the surface material 5 has a small thickness. The label 140 has the transmissive display portion 14*a*. The transmissive display portion 14*a* has any pattern formed by a light transmissive portion 14*b* and a light blocking portion 14*c* (for example, an operation icon obtained by combination of graphics, symbols, letters, numbers, and the like). The transmissive display portion 14*a* illuminates the pattern with the light source 8 and thus can display the pattern. For example, LEDs, inorganic EL, organic EL, or the like can be applied as the light source 8. The sheet-shaped light source 8 may be attached to the label 140 or may be mounted on the label 140. A laminate 14 is attached such that the label 140 is exposed on the face of the foam body 2. In other words, the label 140 is located on the back surface of the surface material 5, and the light source 8 is located on the back surface of the label 140.

Figure 13A:
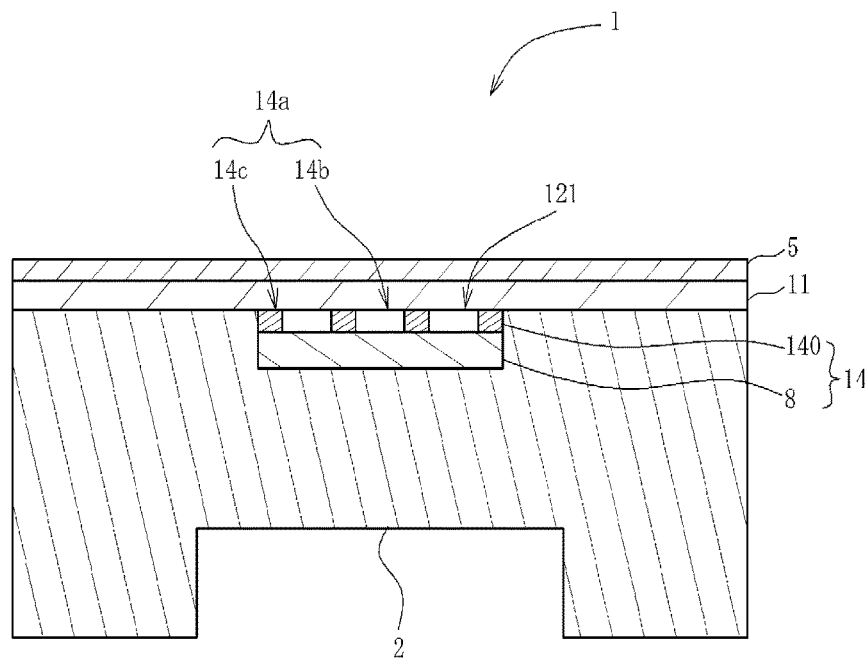
FIGS. 13A and 13B are schematic cross-sectional views illustrating a foam molded product using a laminate of a label and a light source according to another embodiment of the present disclosure.
Figure 13B:
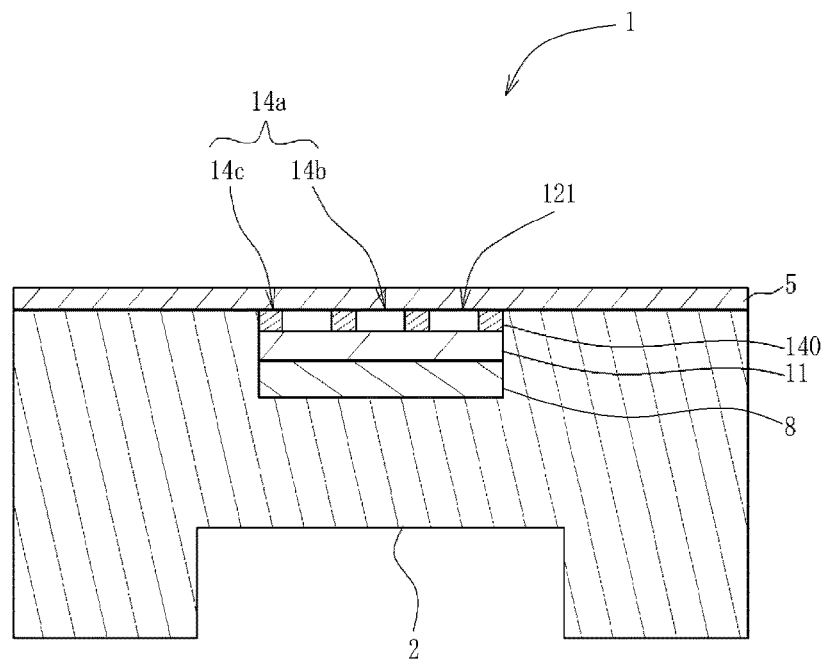

The flexible layer 11 may be provided between the surface material 5 and the label 140 (see FIG. 13A) or may be provided between the label 140 and the light source 8 (see FIG. 13B). In either case, the flexible layer 11 having light transparency is applied.

In addition, the surface material 5, the label 140, the light source 8, and the flexible layer 11 may be affixed together via, for example, an optical adhesive sheet (OCA). All of the four layers may be affixed together, or some of the four layers may be affixed together. Emboss finishing or grooving is preferably performed on the adhesive surface so that air is easily released at the time of affixing the layers.
(Dot Matrix Display Device)

Figure 14A:
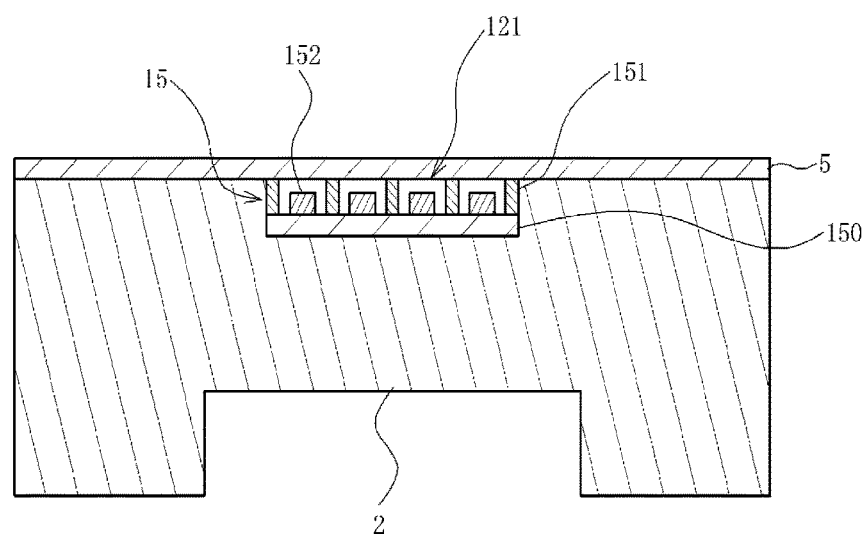
FIG. 14A is a schematic cross-sectional view illustrating a foam molded product using a dot matrix display device according to an embodiment of the present disclosure.
Figure 14B:
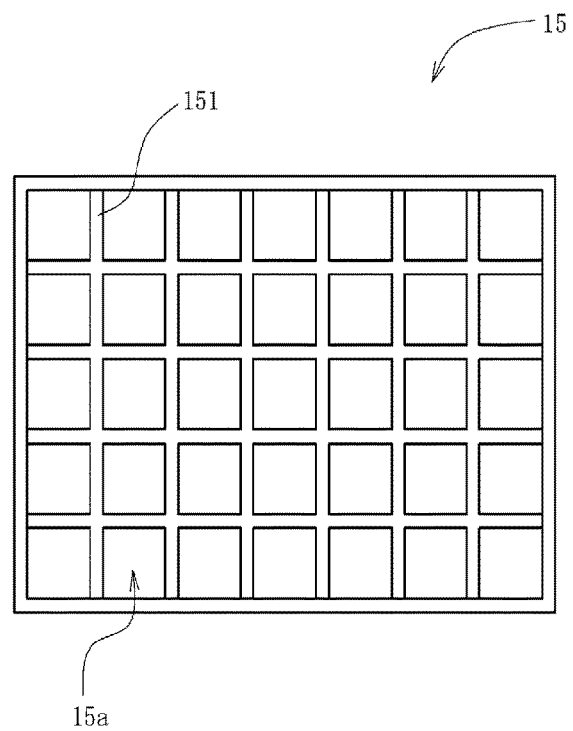
FIG. 14B is a schematic plan view of the dot matrix display device.

The surface material 5 has light transparency, and the display unit included in the insert material 12 is a dot matrix display device 15. The dot matrix display device 15 may be mounted such that the display surface 121 is exposed on the face of the foam body 2 (see FIG. 14A). In addition, FIG. 14B is a plan view of the dot matrix display device 15, and LEDs are not illustrated for convenience.

An example of the configuration in which the surface material 5 having light transparency include a configuration in which the surface material 5 is transparent or translucent (may be colored), a configuration in which an opening is provided in the surface material 5, and a configuration in which a portion of the surface material 5 has a small thickness.

The dot matrix display device 15 includes at least a circuit board 150, light blocking walls 151 formed on the circuit board to define the circuit board in a matrix, and LEDs 152 mounted in respective regions 15*a* defined by the light blocking walls. The dot matrix display device 15 selectively illuminates the LEDs 152 and thus can display a desired pattern (graphics, symbols, letters, numbers, and the like).

Figure 15A:
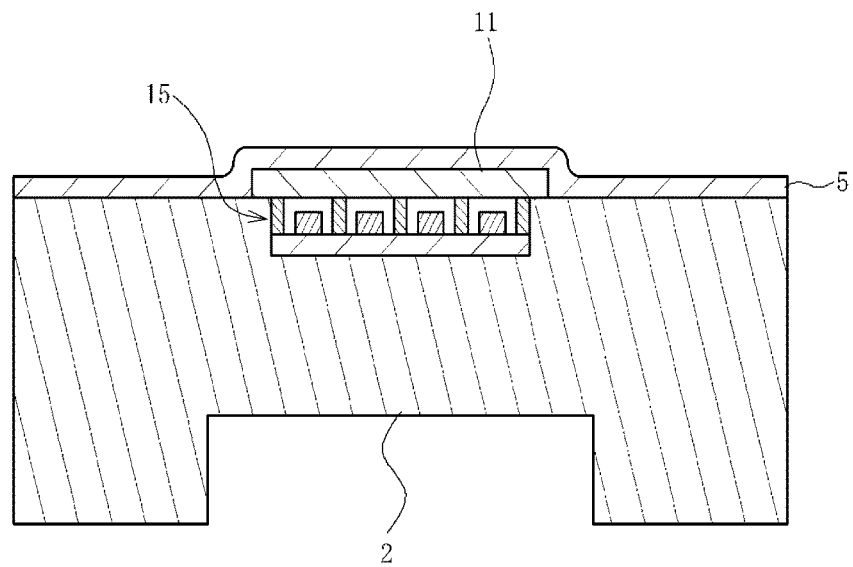
FIGS. 15A and 15B are schematic cross-sectional views illustrating a foam molded product using a dot matrix display device according to another embodiment of the present disclosure.
Figure 15B:
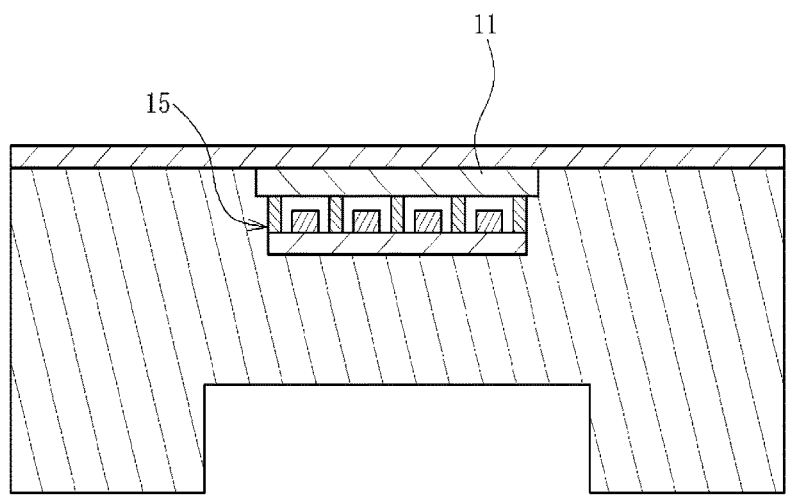

The material of the light blocking walls 151 is not particularly limited; however, when the light blocking walls 151 are formed of a soft material, a user can obtain a softer texture when touching the location of the dot matrix display device. For example, rubber, resin having flexibility, or like can be applied as the soft material. For example, a urethane resin, a vinyl chloride resin, an olefin-based resin, a styrene-based resin, a silicon-based resin, or the like can be applied as the resin having flexibility. In addition, although the complete light blocking effect is not obtained, partially black-colored non-woven fabric, double raschel fabric, or foamed resin sheet, or entirely black-colored non-woven fabric, double raschel fabric, or foamed resin sheet in which holes are formed can also be used. Moreover, the flexible layer 11 may be provided between the surface material 5 and the dot matrix display device 15 (see FIGS. 15A and 15B). With such a configuration, the light blocking walls 151 and the flexible layer 11 have softness; therefore, a user can obtain a softer texture when touching the location of the dot matrix display device. The flexible layer 11 having light transparency is applied. The flexible layer 11 may be provided, as illustrated in FIGS. 15A and 15B, on a portion of the surface to which the dot matrix display device 15 is attached, or may be provided on the whole surface to which the dot matrix display device 15 is attached. In addition, the flexible layer 11 may be located such that the surface of the foam molded product 1 has a protruded portion as illustrated in FIG. 15A, or may be located such that the surface of the foam molded product 1 is flat as illustrated in FIG. 15B.

An example of a method for manufacturing a foam molded product according to an embodiment of the present disclosure will be described below.

A method for manufacturing a foamed molded product of the present disclosure includes: an affixed part arrangement step of preparing a pair of molds 9 including a first mold 91 and a second mold 92, and arranging an affixed part 10 in which the insert material 12 including at least one of the display unit and the detection unit and the surface material 5 are affixed together such that the surface material 5 is in contact with a molding surface of the first mold 91; a mold closing step of closing the pair of molds 9; a molding step of injecting a foam resin into a molding space formed by closing the molds, and foaming the foam resin to form the foam body 2, a mold opening step of opening the pair of molds 9; and a removal step of removing a molded product in which the affixed part 10 and the foam body 2 are integrated (see FIGS. 16A to 16E).

Figure 16A:
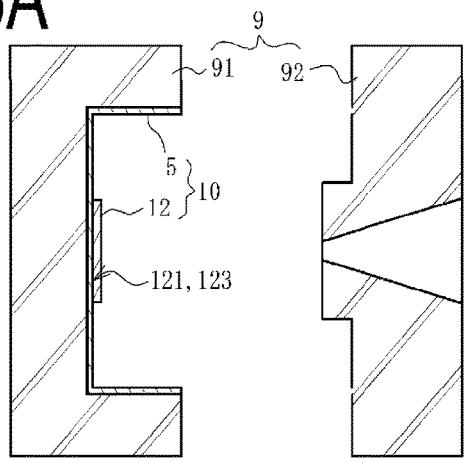
FIGS. 16A to 16E are schematic cross-sectional views illustrating a method for manufacturing a foam molded product according to an embodiment of the present disclosure.
Figure 16D:
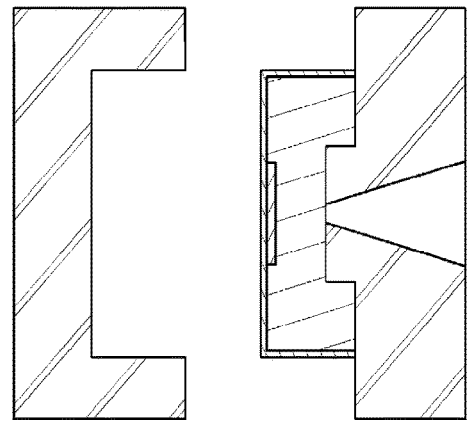

First, the affixed part 10 is arranged on the molding surface of the first mold 91 (see FIG. 16A). The affixed part 10 is a part obtained by affixing at least one of the display surface 121 of the insert material 12 and the detecting surface 123 of the insert material 12 and the surface material 5 together. For example, a material molded by a known method such as slurry molding or vacuum molding is applied as the surface material 5. The insert material 12 is affixed to the molded surface material 5 with, for example, an optical adhesive tape (OCA). The affixed part 10 formed as just described is arranged such that the surface material 5 is in contact with the molding surface of the first mold 91. Further, at the time of arranging the affixed part 10 on the molding surface, air between the affixed part 10 and the molding surface may be sucked through a suction hole (not illustrated) of the first mold, and the affixed part 10 may be fixed to the molding surface.

Figure 17:
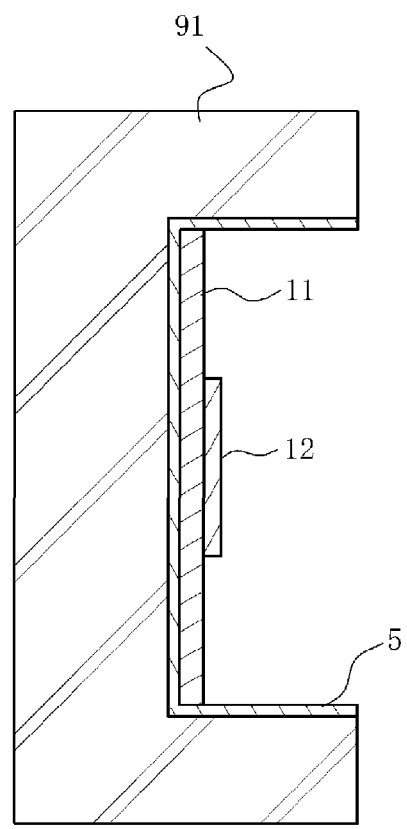
FIG. 17 is a schematic cross-sectional view illustrating a method for manufacturing a foam molded product according to another embodiment of the present disclosure.

Furthermore, the affixed part 10 may be a part obtained by affixing the flexible layer 11 between the insert material 12 and the surface material 5 (see FIG. 17). The insert material 12 and the surface material 5 can be respectively affixed to opposite surfaces of the flexible layer 11, for example, with an OCA. In addition, in a case where the flexible layer 11 is a material having adhesiveness or adhesion, the flexible layer 11 can be affixed by use of the properties thereof.

Figure 16B:
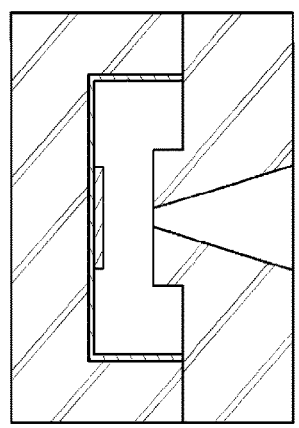

Next, the pair of molds 9 are closed (see FIG. 16B). In the drawings, the first mold 91 is a movable mold and the second mold 92 is a fixed mold; however, reversely, the first mold 91 may be a fixed mold and the second mold 92 may be a movable mold. The molds are closed, and thus a molding space is formed between the first mold 91 and the second mold 92.

Figure 16E:
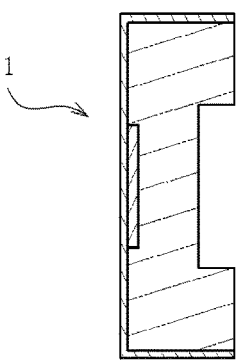
Figure 16C:
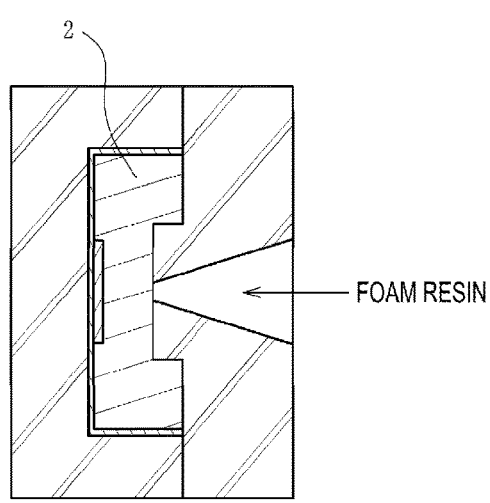

Next, the foam resin is injected into the molding space and foamed to form the foam body 2 (see FIG. 16C). The foam resin includes a resin and a foaming agent. The resin is not particularly limited, and a thermoplastic resin, a thermosetting resin, or the like can be used. For example, a urethane resin, a vinyl chloride resin, an olefin resin, a styrene-based resin, a silicon-based resin, or the like can be used. Of the resins, a soft resin such as a urethane resin is preferably used because flexibility can be imparted by the foam body 2. Air bubbles contained in the foam body 2 may be interconnected cells or may be closed cells. A known method is used as the foaming method. For example, there is a method for injecting a foam resin into a molding space, foaming the foam resin, heating or cooling the resin to solidify the resin, and molding the foam body. Further, a method (core back method) may be applied in which after injecting the foam resin into the molding space, the first mold 91 or the second mold 92 is slightly moved to expand the molding space, and the foam resin is foamed. The pressure of the foam resin in the molding step is, for example, 0.1 MPa or greater and less than 1 MPa in the case of a urethane resin, and the temperature is, for example, 40° C. or higher and 100° C. or lower.

Thus, the method for manufacturing the foam molded product of an embodiment of the present disclosure can lower the pressure and temperature compared with known injection molding. Therefore, no excessive load to damage the insert material is applied. Also, because of low-temperature and low-pressure molding, the texture of the surface material (gains, fluffed state, or the like) can be remained.

Next, the pair of molds 9 are opened (see FIG. 16D), and the foam molded product 1 is removed (see FIG. 16E).

As described above, the form molded product according to an embodiment of the present disclosure can be manufactured.

Figure 18A:
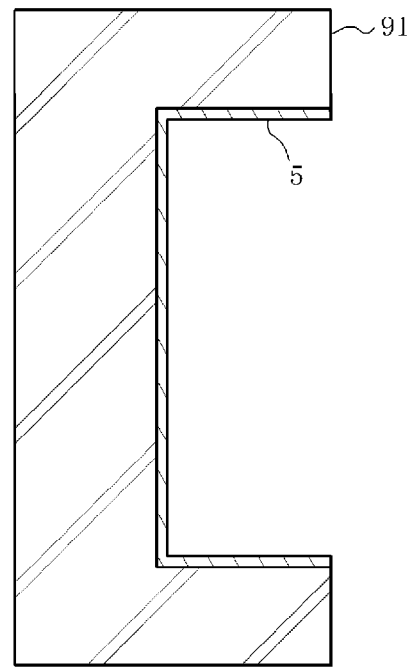
FIGS. 18A and 18B are schematic cross-sectional views illustrating a method for manufacturing a foam molded product according to yet another embodiment of the present disclosure.
Figure 18B:
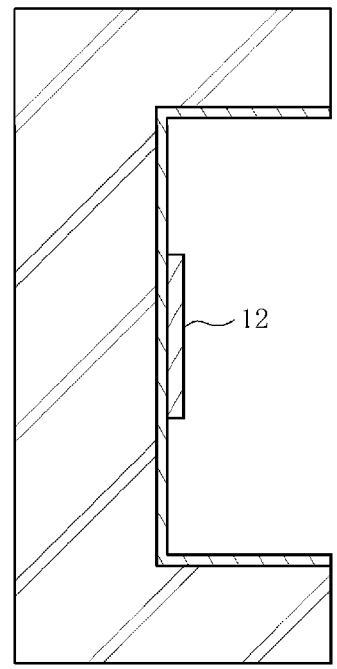

In the above description, the affixed part attachment step of arranging, on the molding surface of the first mold 91, the affixed part 10 in which the surface material 5 and the insert material 12 are affixed together is provided. Alternatively, the following configuration may be applied. In other words, the method may include: a surface material arrangement step of arranging the surface material 5 on the molding surface of the first mold 91 (see FIG. 18A); an insert material arrangement step of arranging the insert material 12 including at least one of the display unit and the detection unit, on one surface of the surface material 5 opposite from the other surface of the surface material 5 being in contact with the molding surface (see FIG. 18B); a mold closing step of closing the pair of molds 9 (see FIG. 16B); a molding step of injecting a foam resin into a molding space formed by closing the molds, and foaming the foam resin to form the foam body 2 (see FIG. 16C); a mold opening step of opening the pair of molds 9 (see FIG. 16D); and a removal step of removing a molded product in which the surface material 5, the insert material 12, and the foam body 2 are integrated (see FIG. 16E). For example, an optical adhesive tape (OCA) is attached in advance to the surface material 5 or the insert material 12, and thus the insert material 12 can be fixed to the surface material 5 in the insert material arrangement step.

Figure 19A:
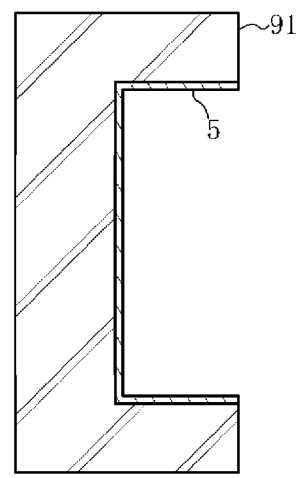
FIGS. 19A to 19C are schematic cross-sectional views illustrating a method for manufacturing a foam molded product according to still another embodiment of the present disclosure.
Figure 19B:
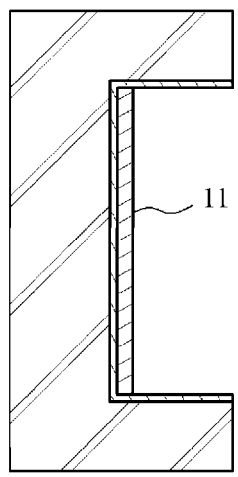
Figure 19C:
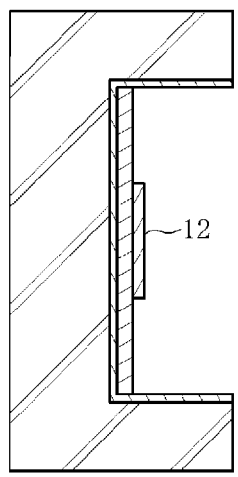
Figure 21A:
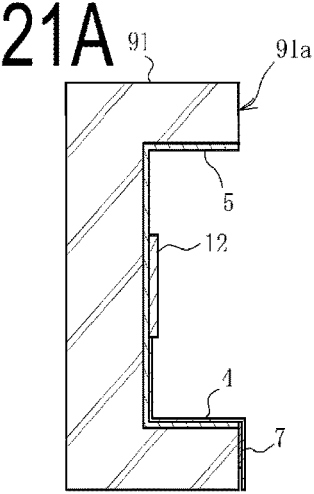
FIGS. 21A to 21F are schematic cross-sectional views illustrating a method for manufacturing a foam molded product according to yet another embodiment of the present disclosure.
Figure 21D:
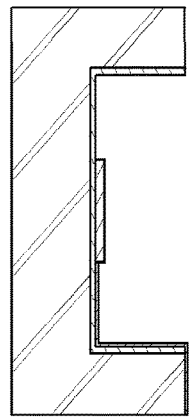
Figure 21D:
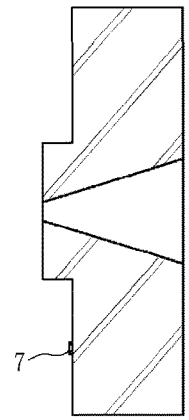
Figure 21B:
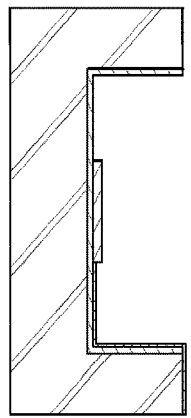
Figure 21E:
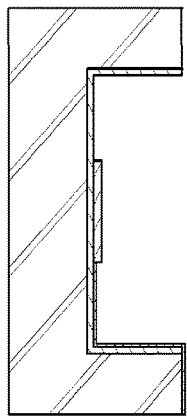
Figure 21E:
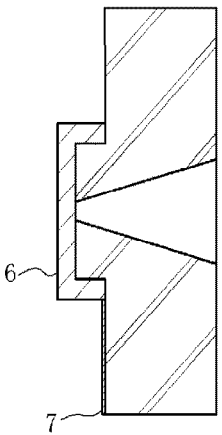
Figure 21C:
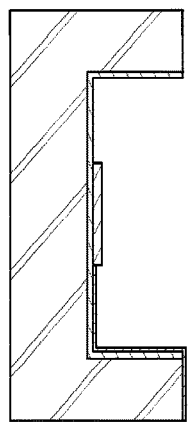
Figure 21F:
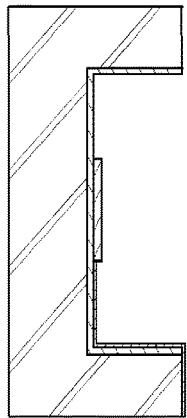
Figure 21F:
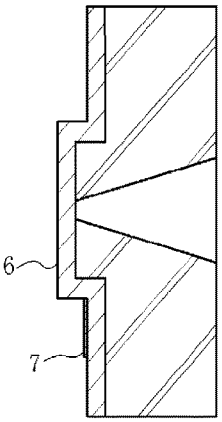

In addition, the manufacturing method may further include a flexible layer arrangement step of arranging the flexible layer 11 between the surface material 5 and the insert material 12. In other words, the foam molded product 1 can be obtained by a surface material arrangement step of arranging the surface material 5 on the molding surface of the first mold 91 (see FIG. 19A), a flexible layer arrangement step of arranging the flexible layer 11 on one surface of the surface material 5 opposite from the other surface of the surface material 5 being in contact with the molding surface (see FIG. 19B), an insert material arrangement step of arranging the insert material 12 on one surface of the flexible layer 11 opposite from the other surface of the flexible layer 11 being in contact with the surface material 5 (see FIG. 19C), the mold closing step (see FIG. 16B), the molding step (see FIG. 16C), the mold opening step (see FIG. 16D), and the removal step (see FIG. 16E).

The method for manufacturing the foamed molded product may further include a base substrate arrangement step of arranging the base substrate 6 on a molding surface of the second mold 92 before the mold closing step (see FIGS. 20A to 20D). As long as the base substrate 6 is arranged before the mold closing step, the timing thereof is not particularly limited. The shape of the base substrate 6 may include, for example, a shape extending along the molding surface of the second mold 92 (see FIGS. 20A and 20B), a shape overlapped with a parting surface of the second mold 92 (see FIG. 20C), or the like. In the latter case, excess portions of the base substrate 6 are trimmed, and thus the foam molded product 1 can be obtained (see FIG. 20D).

Further, the insert material 12 may have the wiring member 4 having a length protruding to a parting surface 91a of the first mold, and the soft seal material 7 may be formed on at least one of the parting surface 91a of the first mold 91 and a parting surface 92a of the second mold 92 (see FIGS. 21A to 21F).

The soft seal material 7 is formed on the parting surface 91a of the first mold 91 or the parting surface 92a of the second mold 92, or on both the parting surfaces 91a and 92a. The soft seal material 7 may be formed to cover the parting surfaces 91a, 92a (see FIGS. 21A, 21B, and 21E) or may be formed on a part of the parting surfaces 91a, 92a (see FIGS. 21C and 21D). Furthermore, when the parting surface 92a of the second mold is covered by the base substrate 6, the soft seal material 7 may be formed on the base substrate 6 (see FIG. 21F) or may be formed on the parting surface 91a of the first mold 91.

The soft seal material 7 is formed, and thus, in the molding step, burrs can be prevented from being formed by the foam resin leaked from the molding space. In addition, the soft seal material 7 is in contact with the wiring member 4, and thus the mold closing force applied to the wiring member 4 is relieved in the mold closing step. Therefore, the wiring member 4 can be prevented from breaking.

Figure 22A:
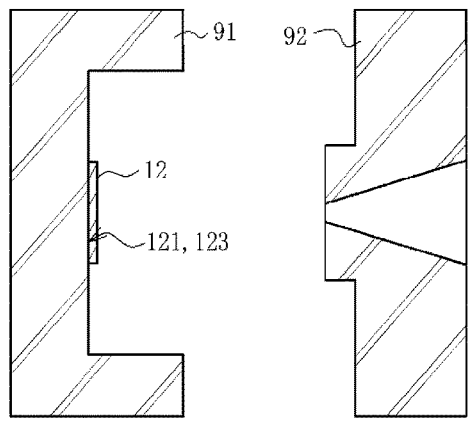
FIGS. 22A to 22E are schematic cross-sectional views illustrating a method for manufacturing a foam molded product according to still another embodiment of the present disclosure.
Figure 22D:
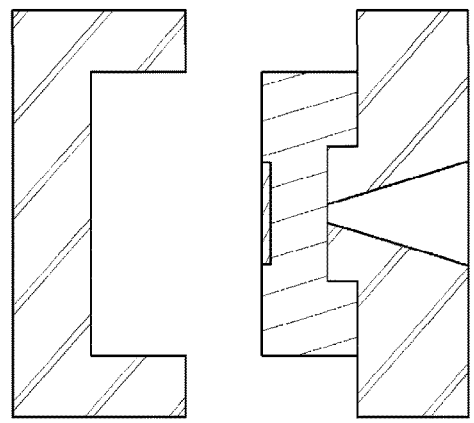
Figure 22B:
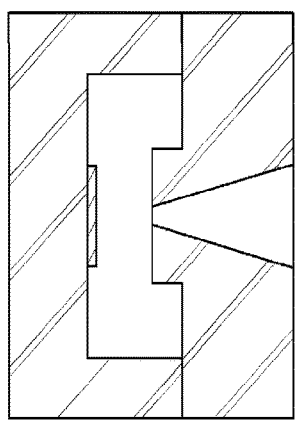
Figure 22E:
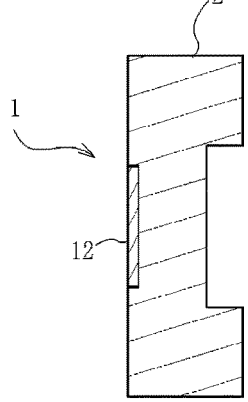
Figure 22C:
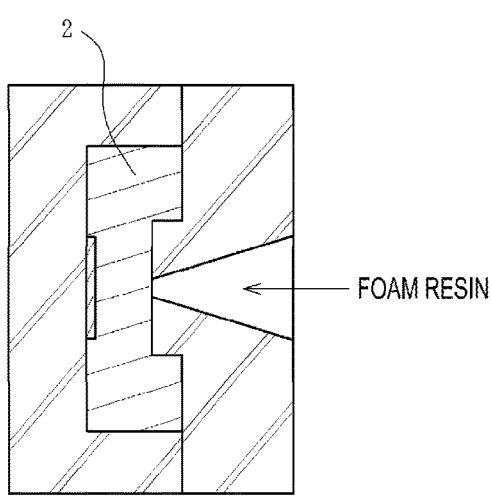

A method for manufacturing a foam molded product according to another embodiment of the present disclosure includes: an insert material arrangement step of preparing a pair of molds 9 including the first mold 91 and the second mold 92, and arranging the insert material 12 having at least one of the display unit and the detection unit on the molding surface of the first mold 91 (see FIG. 22A), a mold closing step of closing the pair of molds 9 (see FIG. 22B); a molding step of injecting a foam resin into a molding space formed by closing the molds and foaming the foam resin to form the foam body 2 (see FIG. 22C); a mold opening step of opening the pair of molds 9 (see FIG. 22D); and a removal step of removing a molded product in which the insert material 12 and the foam body 2 are integrated (see FIG. 22E).

Further, a method for manufacturing a foam molded product according to another embodiment of the present disclosure includes: an insert material arrangement step of preparing a pair of molds 9 including the first mold 91 and the second mold 92, and arranging the insert material 12 having at least one of the display unit and the detection unit on the molding surface of the first mold 91; a base substrate arrangement step of arranging the base substrate 6 on the molding surface of the second mold 92; a mold closing step of closing the pair of molds 9; a molding step of injecting a foaming resin into a molding space formed by closing the molds, and foaming the foam resin to form a foam body 2; a mold opening step of opening the pair of molds 9; and a removal step of removing a molded product in which the insert material 12, the base substrate 6, and the foam body 2 are integrated (see FIGS. 23A to 23F). In addition, the insert material and the base substrate may be arranged at the same time as illustrated. Alternatively, after arranging one of the insert material and the base substrate, the other of the insert material and the base substrate may be arranged.

Figure 23A:
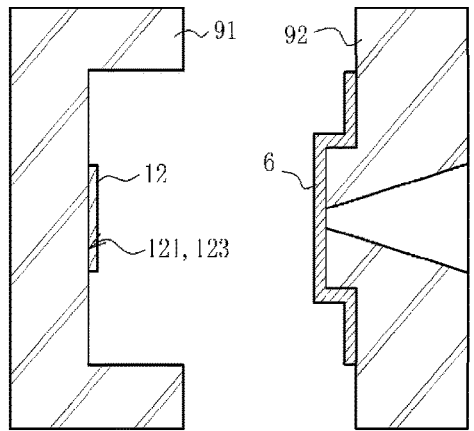
FIGS. 23A to 23F are schematic cross-sectional views illustrating a method for manufacturing a foam molded product according to another embodiment of the present disclosure.
Figure 23D:
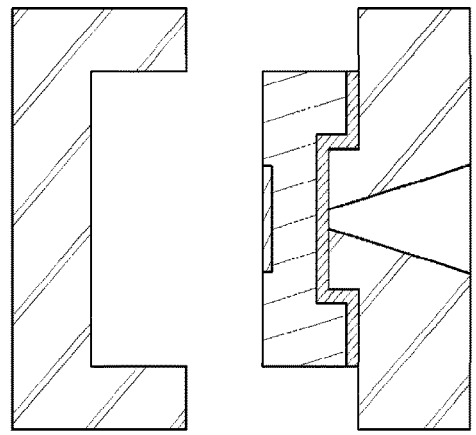
Figure 23B:
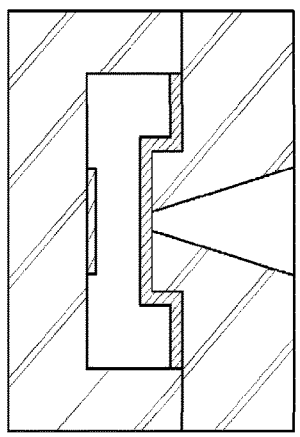
Figure 23E:
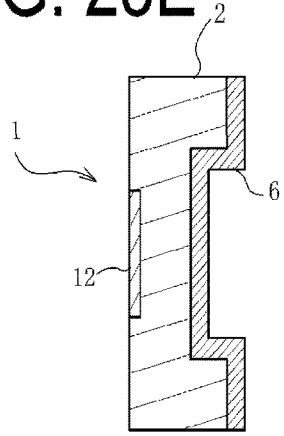
Figure 23C:
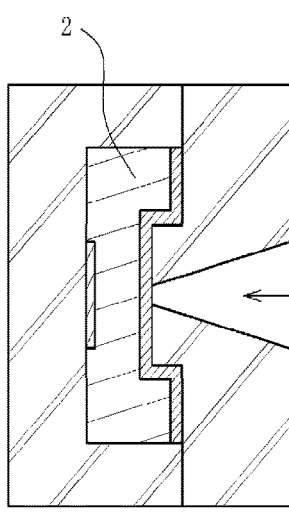
Figure 23F:
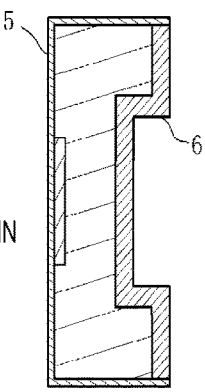

Furthermore, the method for manufacturing the foam molded product according to another embodiment of the present disclosure further includes an affixing step of affixing the surface material 5 to the aforementioned molded product in which the insert material 12, the base substrate 6, and the foam body 2 are integrated such that the surface material 5 covers the insert material 12 (see FIG. 23F). The surface material 5 is affixed later; therefore, there are a number of variations of the surface material 5 that can be used. For example, the surface material 5 made of three-dimensionally sewn leather, the surface material 5 having the surface on which an embossed pattern is formed by embossing or surface texturing, or the like can be used. In the manufacturing method of the embodiment, the three-dimensional shape is not crushed; therefore, decorative properties of the foamed molded product can be improved.

Further, a method for manufacturing a foam molded product according to another embodiment of the present disclosure includes: a base substrate arrangement step of preparing a pair of molds 9 including the first mold 91 having the molding surface with a protruded portion 91b that has the same size in planar view as the insert material 12 including at least one of the display unit and the detection unit, and the second mold 92, and arranging the base substrate 6 on the molding surface of the second mold 92; a mold closing step of closing the pair of molds 9; a molding step of injecting a foam resin into a molding space formed by closing the molds, and foaming the foam resin to form the foam body 2 including a recessed portion 2a formed by the protruded portion 91b of the first mold 91; a mold opening step of opening the pair of molds 9; and a removal step of removing a molded product in which the base substrate 6 and the foam body 2 are integrated; and an affixing step of affixing the surface material 5 affixed with the insert material 12 to the molded product such that the insert material 12 is fitted into the recessed portion 2a (see FIGS. 24A to 24F).

The first mold 91 includes the protruded portion 91b on the molding surface. The protruded portion 91b is the same size in a plane view as the insert material 12 having at least one of the display unit and the detection unit. The base substrate 6 is arranged on the molding surface of the second mold 92 (see FIG. 24A). Next, the pair of molds are closed (see FIG. 24B), and then the foam resin is injected into the molding space and foamed to form the foam body 2 (see FIG. 24C). At this time, the recessed portion 2a having the size coinciding with the protruded portion 91b is formed in the foam body 2 by the protruded portion 91b of the first mold 91. Next, the pair of molds are opened (see FIG. 24D), and then the molded product is removed (see FIG. 24E). Thereafter, the surface material 5 affixed with the insert material 12 is affixed to the molded product such that the insert material 12 is fitted into the recessed portion 2a (see FIG. 24F). At least one of the display surface 121 of the insert material 12 and the detecting surface 123 of the insert material 12 is affixed to the surface material.

Figure 24A:
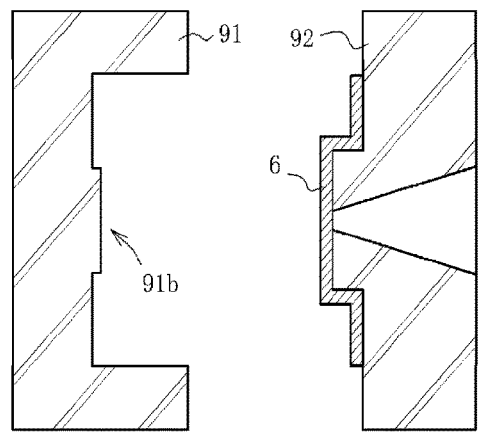
FIGS. 24A to 24F are schematic cross-sectional views illustrating a method for manufacturing a foam molded product according to yet another embodiment of the present disclosure.
Figure 24D:
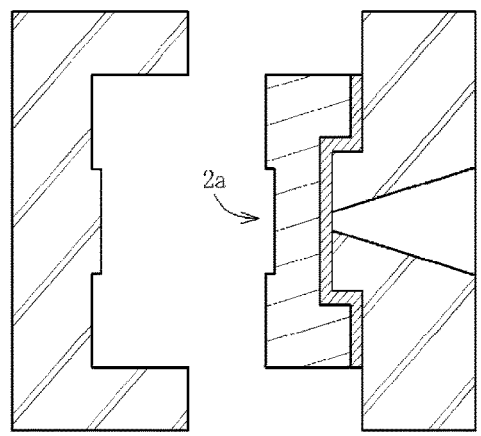
Figure 24B:
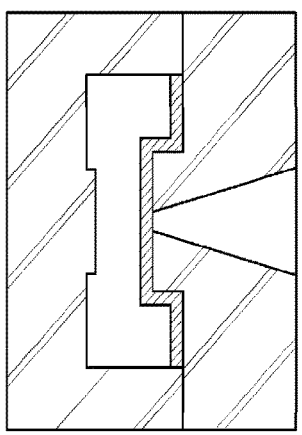
Figure 24E:
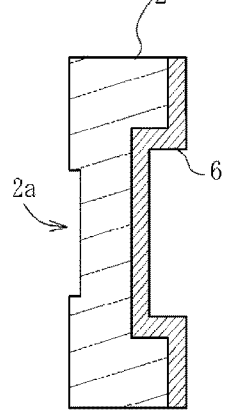
Figure 24C:
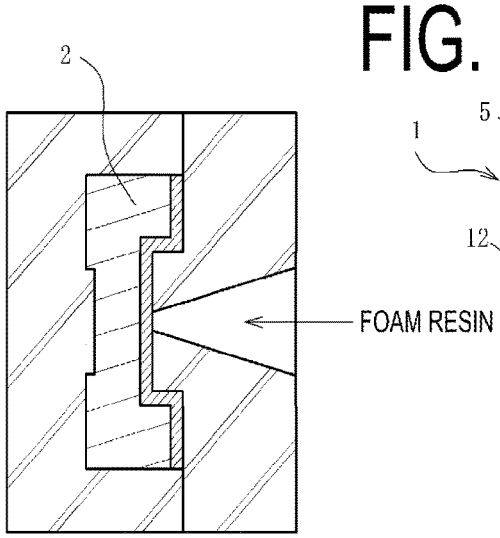
Figure 24F:
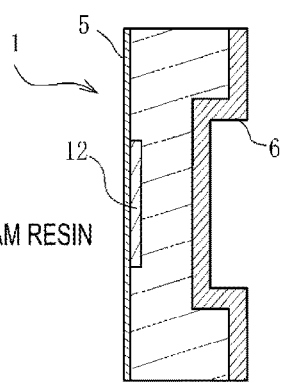

In addition, in FIG. 24F, an affixed part in which the flexible layer 11 is affixed between the surface material 5 and the insert material 12 may be affixed to the molded product.

Figure 25A:
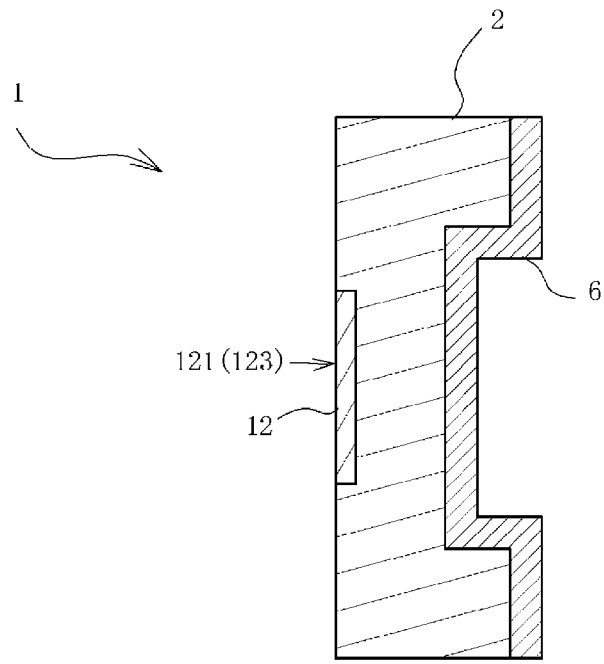
FIGS. 25A and 25B are schematic cross-sectional views illustrating a method for manufacturing a foam molded product according to still further embodiment of the present disclosure.
Figure 25B:
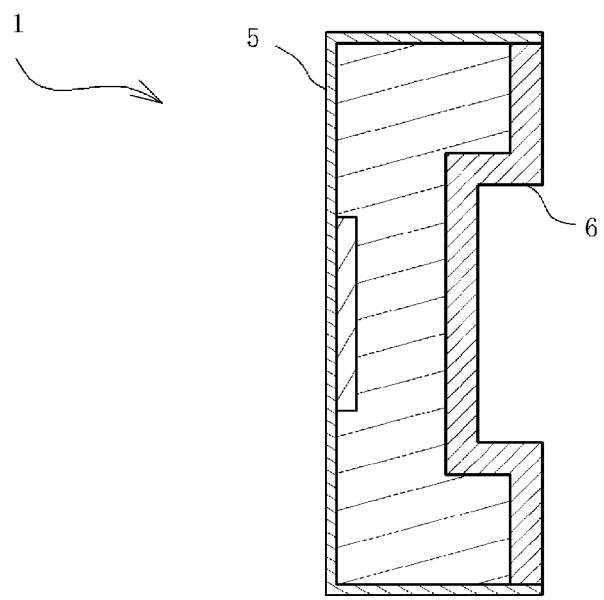

Further, a method for manufacturing a foam molded product according to another embodiment of the present disclosure includes: a base substrate arrangement step of preparing a pair of molds 9 including the first mold 91 having the molding surface with the protruded portion 91b that has the same size in planar view as the insert material 12 including at least one of the display unit and the detection unit, and the second mold 92, and arranging the base substrate 6 on the molding surface of the second mold 92; a mold closing step of closing the pair of molds 9; a molding step of injecting a foam resin into a molding space formed by closing the molds, and foaming the foam resin to form the foam body 2 including the recessed portion 2a formed by the protruded portion 91b of the first mold 91; a mold opening step of opening the pair of molds 9; and a removal step of removing a molded product in which the base substrate 6 and the foam body 2 are integrated; an insert material attachment step of attaching the insert material 12 to the recessed portion 2a such that at least one of the display surface 121 of the display unit and the detecting surface 123 of the detection unit is exposed (see FIG. 25A); and an affixing step of affixing the surface material 5 to the molded product such that the surface material covers the insert material 12 (FIG. 25B).

The steps until the molded product is removed correspond to FIGS. 24A to 24E and therefore will not be described. After the removal step, the insert material 12 is attached to the recessed portion 2a of the foam body 2 (see FIG. 25A). At the time of attaching the insert material to the recessed portion, at least one of the display surface 121 of the display unit and the detecting surface 123 of the detection unit is exposed. For the attachment method, the insert material 12 may be simply arranged in the recessed portion 2a or may be affixed to the recessed portion 2a with an adhesive or a gluing agent.

In addition, after attaching the insert material 12, the flexible layer 11 may be affixed to the surface to which at least the insert material is attached, and additionally, the surface material may be affixed above the surface to which the insert material and the flexible layer are attached.

Figure 26A:
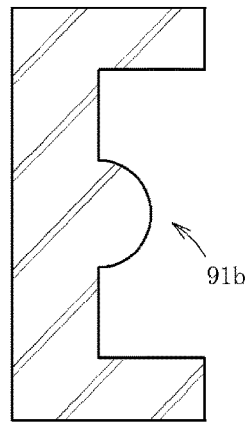
FIGS. 26A to 26E are schematic cross-sectional views illustrating an example of a mold used in a method for manufacturing a foam molded product according to an embodiment of the present disclosure.
Figure 26B:
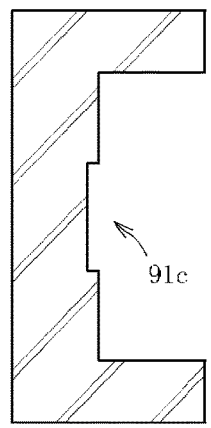
Figure 26C:
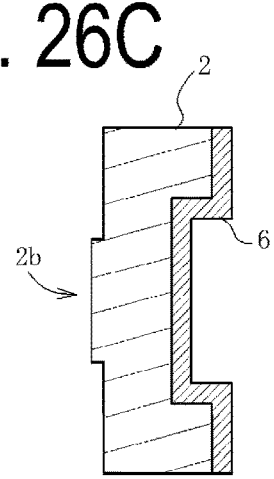
Figure 26D:
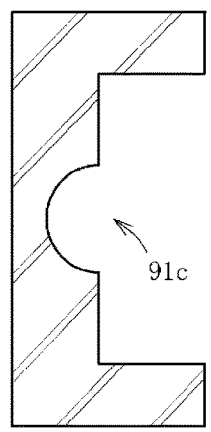

Further, for example, in FIGS. 16A to 16E or FIGS. 24A to 24F, the first mold 91 may include the protruded portion 91b or a recessed portion 91c having a curved surface on the molding surface (see FIGS. 26A and 26D). The protruded portion 91b or the recessed portion 91c having the curved surface is the same size as the insert material in planar view. In this case, a flexible material that can conform to the curved surface is used as the insert material.

Alternatively, the first mold 91 may include the recessed portion 91c on the molding surface, which has the same size as the insert material in planar view (see FIG. 26B). For example, in the case of using the first mold with the recessed portion in the manufacturing method as in FIGS. 16A to 16E, the insert material may be positioned in alignment with the recessed portion 91c, and thus positioning of the insert material can be easily made. Furthermore, in the case of using the first mold with the recessed portion in the manufacturing method as in FIGS. 24A to 24F, the molded product includes a protruded portion 2b as illustrated in FIG. 26C. The protruded portion 2b has the same size as the insert material 12 in planar view; therefore, positioning can be easily made at the time of attaching the insert material to the molded product.

Figure 26E:
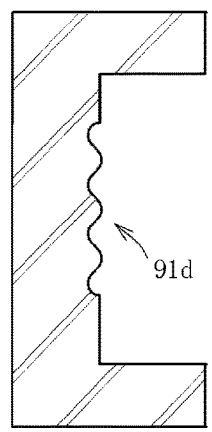

Moreover, as illustrated in FIG. 26E, the first mold 91 may include an uneven portion 91d on the molding surface. The insert material is positioned in alignment with the location where the uneven portion is formed, and a foam molded product is obtained. In such a case, the location of the uneven portion enables a user to understand the position of the insert material of the molded product. In addition, when pressing the location, the user can feel soft from the location. In other words, in such a foam molded product, the user can operate without recognizing the location of the insert material (blind-touch operation).

Additionally, in FIGS. 24A to 24F, 25A, and 25B, in a case where the insert material includes a wiring member, only the foam body 2 is processed or the foam body 2 and the base substrate 6 are processed, and thus the wiring member can be protruded to the back side of the foam molded product 1.

(Touch Sensor)

The detection unit included in the insert material 12 may be the touch sensor 3. In the case of using the touch sensor 3, in each of the aforementioned manufacturing methods (see FIGS. 16A to 26E), a manufacturing method can be applied in which the insert material 12 is replaced with the touch sensor 3 and the detecting surface 123 is replaced with the detecting surface 3a of the touch sensor.

Further, a biosensor can be used instead of the touch sensor 3. The biosensor is, for example, a sensor that can detect biological information of a user, such as body temperature, pulse, blood pressure, posture, and the like. Furthermore, both the touch sensor and the biosensor can be used. In this case, both the touch sensor and the biosensor may be disposed overlapped with each other or may be arranged side by side.

In addition, a wireless battery charger can be used instead of the touch sensor 3. Moreover, both the touch sensor 3 and the wireless battery charger can be used. In this case, for example, both the touch sensor and the wireless battery charger are arranged side by side in the foam molded product 1, and thus the foam molded product 1 that is operated in a touchable way and that may be wirelessly charged can be obtained.

In addition, the foam molded product 1 may use a biosensor or a wireless battery charger instead of the touch sensor 3 and may further include the light source 8. In this case, the foam molded product 1 can be obtained in which the touch sensor 3 illustrated in FIGS. 10A to 10F is replaced with the biosensor or the wireless battery charger. In such a foam molded product 1, advantageously, the light source is lighted during, for example, biological measurement or charging, and the light source is turned off when biological measurement or charging is completed.

(Tact Switch)

The detection unit included in the insert material 12 may be the tact switch 13. In the case of using the tact switch 13, in each of the aforementioned manufacturing methods (see FIGS. 16A to 26E), a manufacturing method can be applied in which the insert material 12 is replaced with the tact switch 13 and the detecting surface 123 is replaced with the pressing surface 13a of the tact switch 13.

Figure 27:
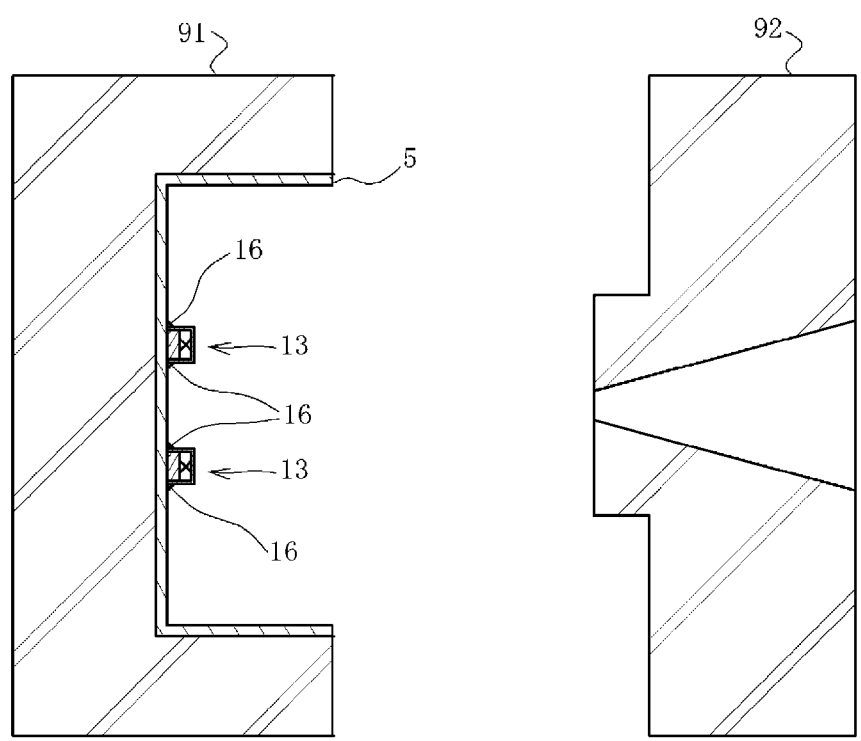
FIG. 27 is a schematic cross-sectional view illustrating an example of a method for manufacturing a foam molded product using a tact switch according to an embodiment of the present disclosure.

A seal material 16 may also be disposed on the outer periphery of the tact switch 13 (see FIG. 27). With such a configuration, the intrusion of foam resin into a movable part of the tact switch 13 can be prevented, and an operational feeling of the switch can be maintained. In addition, the seal material 16 may be soft.

Figure 28:
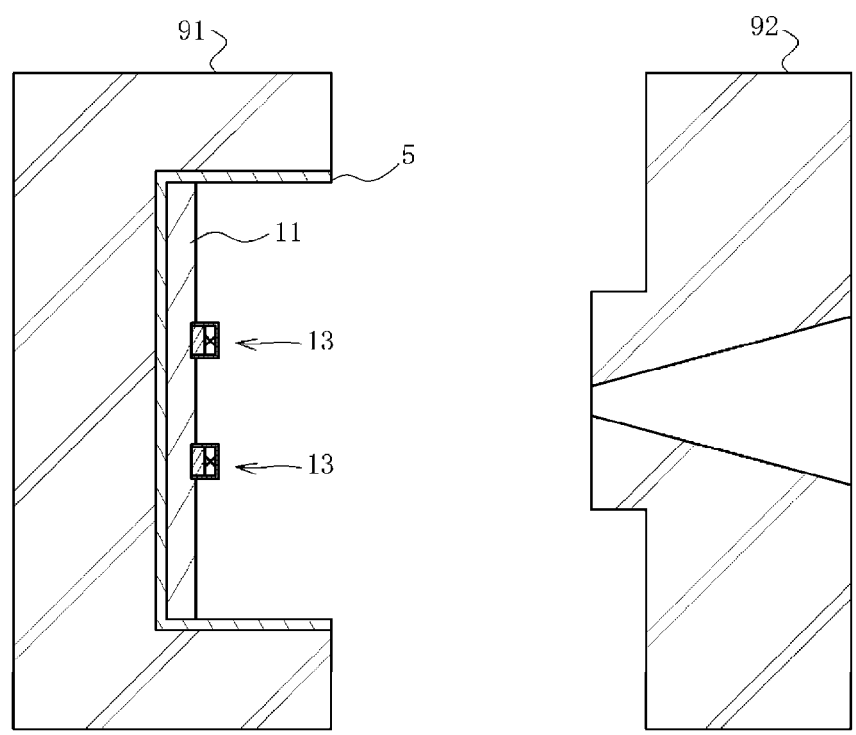
FIG. 28 is a schematic cross-sectional view illustrating a method for manufacturing a foam molded product using a tact switch according to another embodiment of the present disclosure.

Further, in a case where the flexible layer 11 is disposed between the surface material 5 and the tact switch 13, the tact switch 13 is preferably arranged such that the outer wall of the tact switch 13 is embedded into the flexible layer 11 (see FIG. 28). With such a configuration, the intrusion of foam resin into a movable part of the tact switch 13 can be prevented, and an operational feeling of the switch can be maintained.

(Laminate)

The surface material 5 has light transparency, and the display unit included in the insert material 12 may be the laminate 14 of the label 140 having the transmissive display portion 14a and the light source 8. In the case of using the laminate 14, in each of the aforementioned manufacturing methods (see FIGS. 16A to 26E), a manufacturing method can be applied in which the insert material 12 is replaced with the laminate 14 of the label 140 having the transmissive display portion 14a and the light source 8.

Figure 29A:
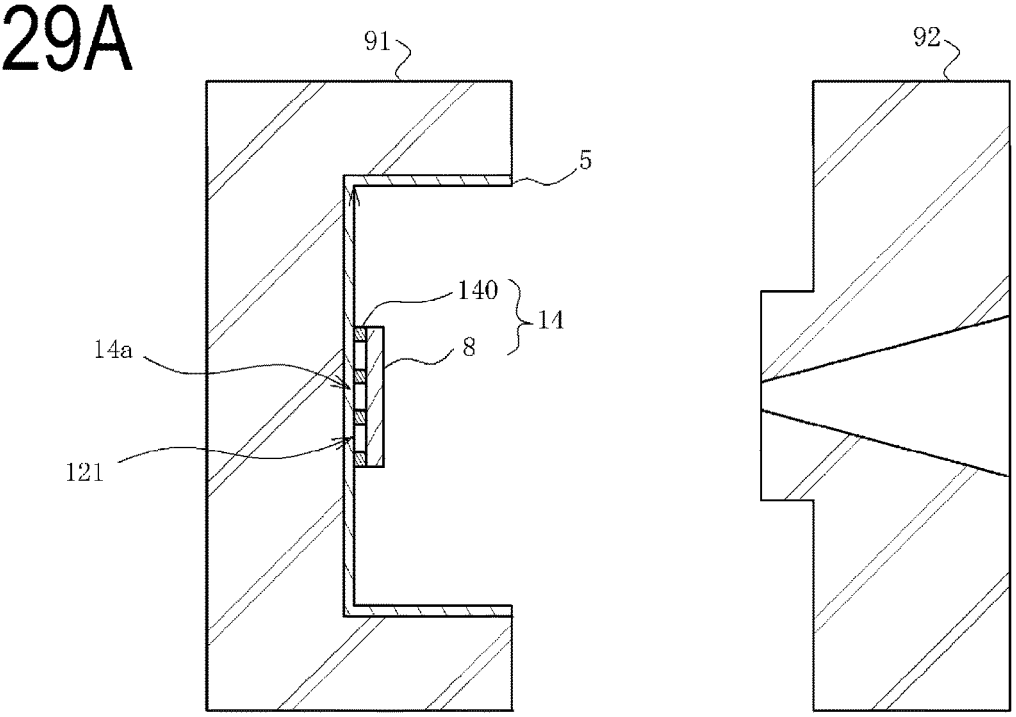
FIGS. 29A and 29B are schematic cross-sectional views illustrating an example of a method for manufacturing a foam molded product using a laminate of a label and a light source according to an embodiment of the present disclosure.
Figure 29B:
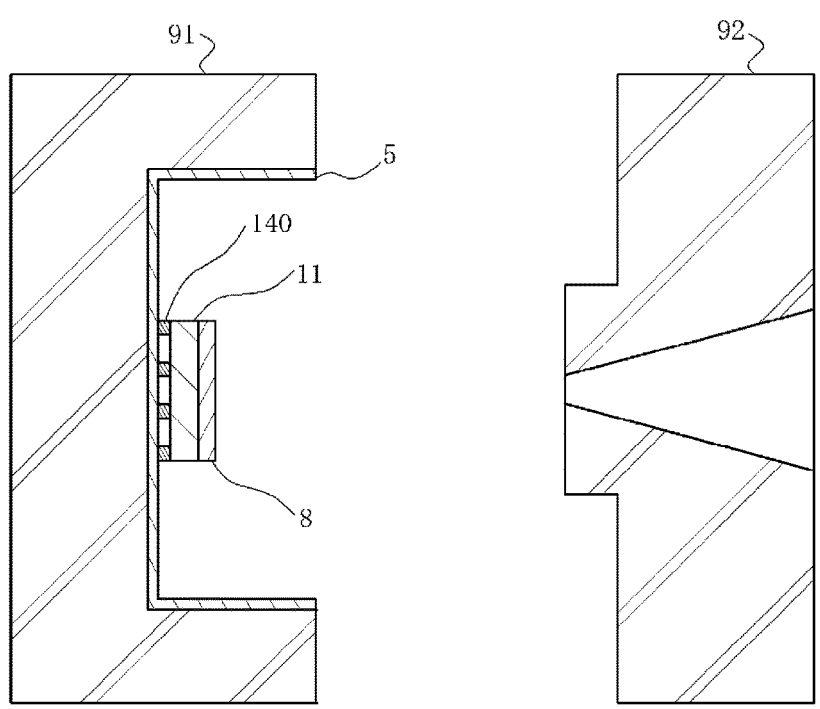

Further, in a case where the laminate 14 is disposed on the surface material 5, the display surface 121 of the laminate 14 is disposed in contact with the surface material 5 (see FIG. 29A). Furthermore, in the case of arranging the flexible layer 11, the flexible layer 11 having light transparency is used, and the flexible layer 11 can be arranged between the label 140 and the light source 8 (see FIG. 29B).

The laminate 14 is affixed to the surface material 5 inserted into the mold and thus is fixed. Therefore, even when a foam resin is injected into the mold and foamed, the transmissive display portion 14a is unlikely to be dislocated.

(Dot Matrix Display Device)

The surface material 5 has light transparency, and the display unit included in the insert material 12 may be the dot matrix display device 15. In the case of using the dot matrix display device 15, in each of the aforementioned manufacturing methods (see FIGS. 16A to 26E), a manufacturing method can be applied in which the insert material 12 is replaced with the dot matrix display device 15.

Figure 30A:
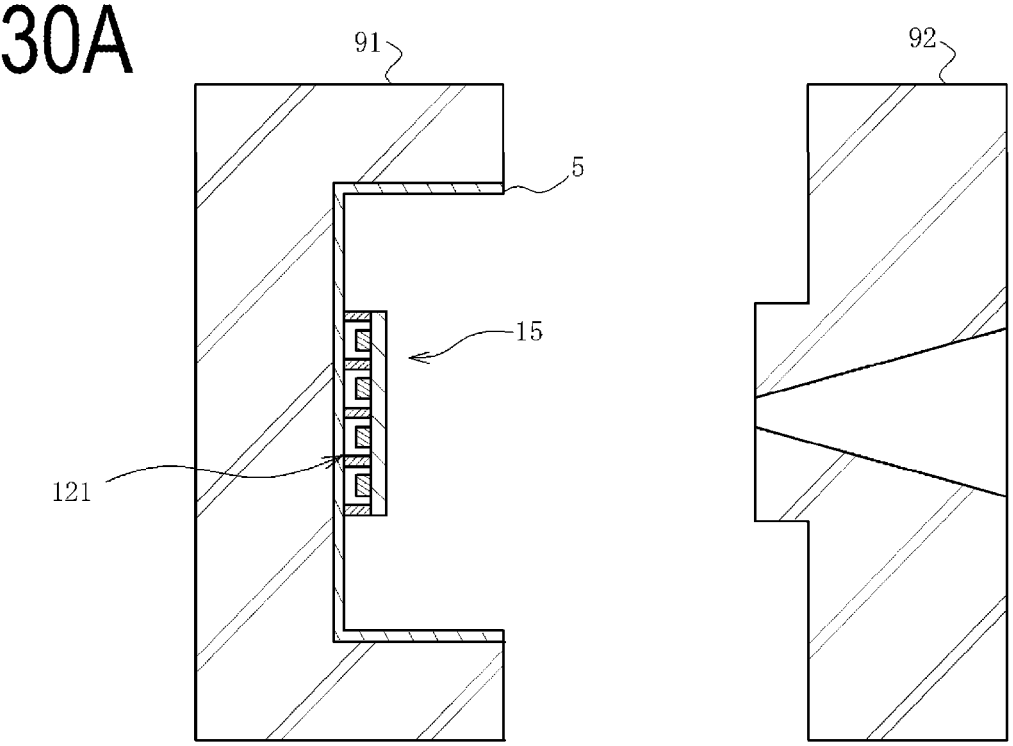
FIGS. 30A and 30B are schematic cross-sectional views illustrating an example of a method for manufacturing a foam molded product using a dot matrix display device according to an embodiment of the present disclosure.
Figure 30B:
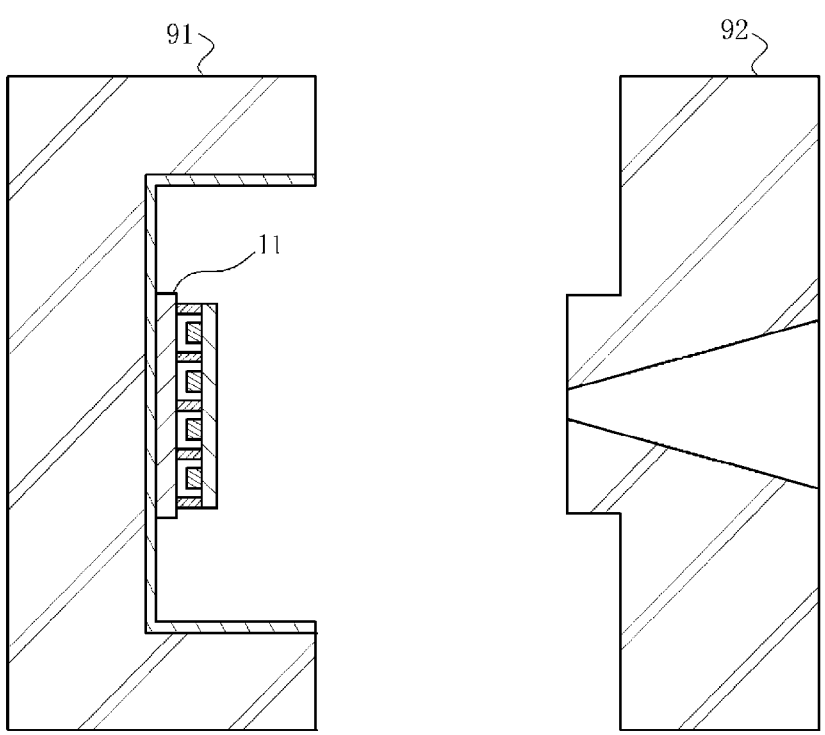

Further, when the dot matrix display device 15 is disposed on the surface material 5, the display surface 121 of the dot matrix display device 15 is disposed in contact with the surface material 5 (see FIG. 30A). Furthermore, in the case of arranging the flexible layer 11, the flexible layer 11 having light transparency is used, and the flexible layer 11 can be disposed between the display surface 121 of the dot matrix display device 15 and the surface material 5 (see FIG. 30B).

Figure 31A:
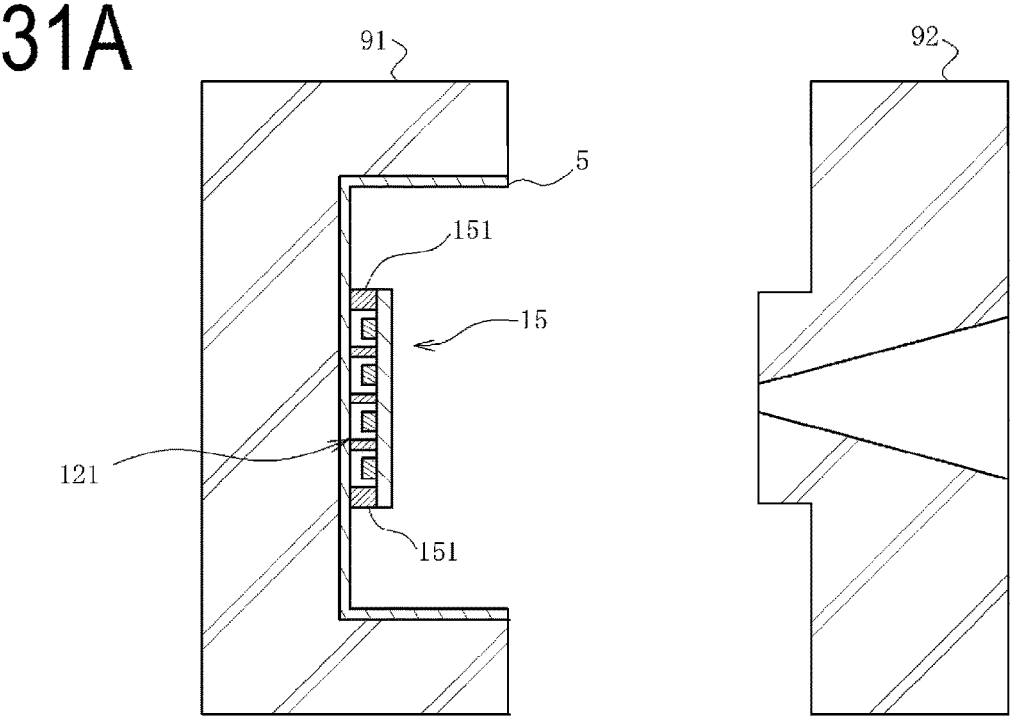
FIGS. 31A and 31B are schematic cross-sectional views illustrating an example of a method for manufacturing a foam molded product using a dot matrix display device according to an embodiment of the present disclosure.
Figure 31B:
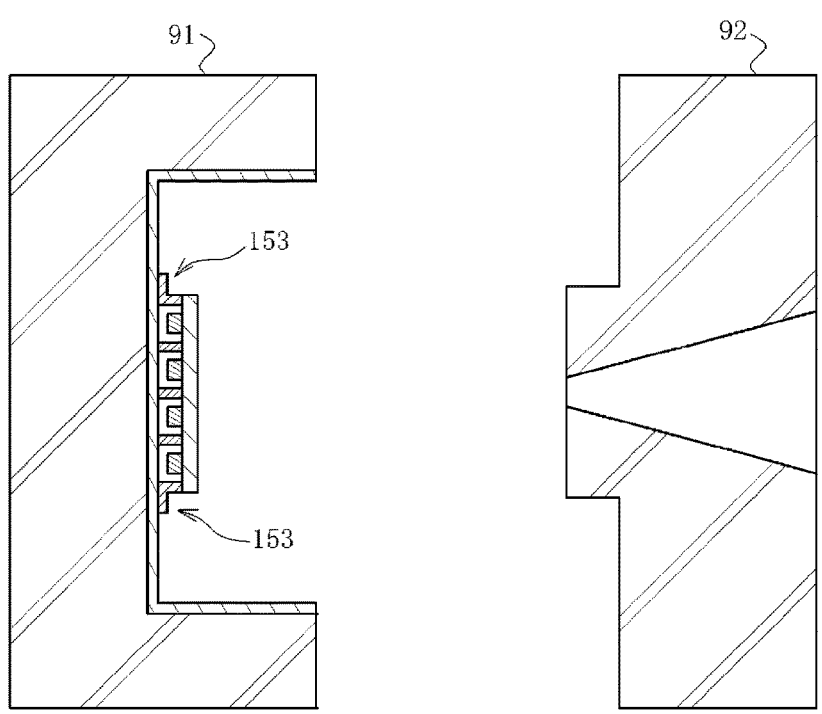
Figure 32A:
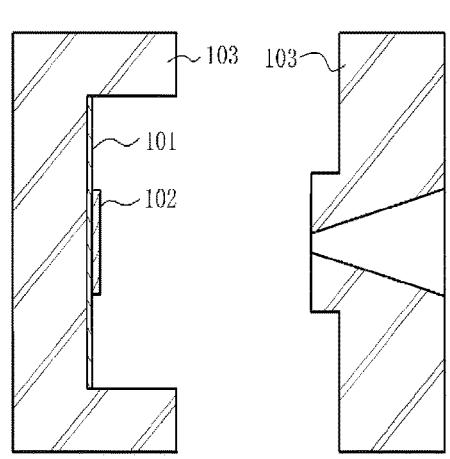
FIGS. 32A to 32C, and FIG. 32E are schematic cross-sectional views illustrating an example of a known method for manufacturing a foam molded product.
Figure 32C:
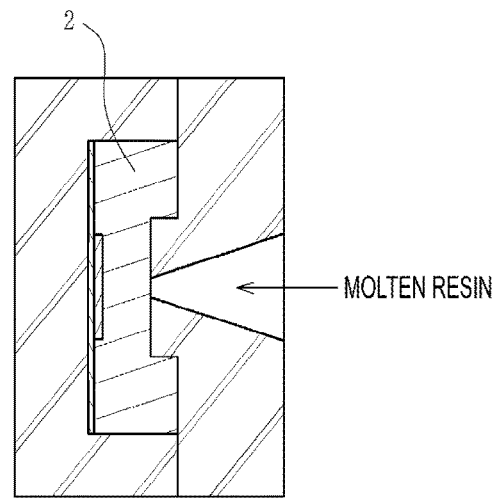
Figure 32B:
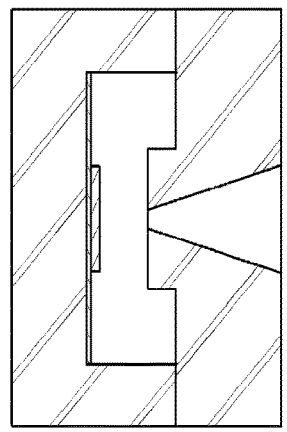
Figure 32E:
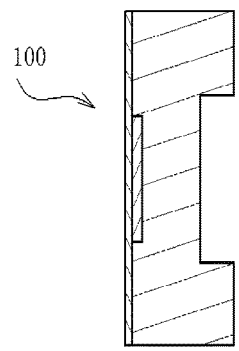

In addition, the outermost light blocking wall 151 of the dot matrix display device 15 may have thickness larger than that of the light blocking wall 151 located inward of the outermost light blocking wall 151 (see FIG. 31A). With such a configuration, the outermost light blocking wall 151 can be prevented from being deformed inward by pressure of the foam resin. Moreover, the same effect can also be obtained by providing a flange 153 on the outermost light blocking wall (see FIG. 31B).

Further, for example, a display using inorganic EL or organic EL can be applied as the display unit. Alternatively, for example, displaying with a light guide plate can also be applied as the display unit. Furthermore, for example, an infrared sensor, a sound sensor, an odor sensor, a gas sensor, a temperature sensor, an ultrasonic sensor, or the like can be applied as the detection unit. In addition, a device that can be used in combination with the display unit or the detection unit is a heater or the like.

BRIEF DESCRIPTION OF THE REFERENCE NUMERALS

1: Foam molded product
2: Foam body
2*a* Recessed portion
2*b*: Protruded portion
3: Touch sensor
3*a*: Detecting surface
4: Wiring member
5: Surface material
6: Base substrate
7: Soft seal material
8: Light source
9: Mold
91: First mold
91*a*: Parting surface of first mold
91*b*: Protruded portion
91*c*: Recessed portion
91*d*: Uneven portion
92: Second mold
92*a*: Parting surface of second mold
PL: Parting line
10: Affixed part
11: Flexible layer
12: Insert material
121: Display surface
123: Detecting surface
13: Tact switch
13*a*: Pressing surface
130: Inversion spring
14: Laminate
14*a*: Transmissive display portion
14*b*: Light transmissive portion
14*c*: Light blocking portion
140: Label
15: Dot matrix display device
15*a*: Region
150: Circuit board
151: Light blocking wall
152: LED
153: Flange
16: Seal material
100: Molded product
101: Surface material
102: Touch sensor
103: Mold

The invention claimed is:

1. A foam molded product, comprising:
   a foam body;
   an insert material including at least one of a display unit and a detection unit attached to the foam body;
   a surface material affixed to a surface to which at least the insert material is attached; and
   a flexible layer disposed between the insert material and the surface material and on the surface to which at least the insert material is attached.

2. The foam molded product according to claim 1, further comprising a base substrate disposed on an opposite surface from the surface to which the insert material of the foam body is attached.

3. The foam molded product according to claim 1, wherein the insert material includes a wiring member having a length protruding from a parting line of the foam molded product, and
   the foam molded product further comprises a soft seal material formed around the parting line.

4. The foam molded product according to claim 2, wherein the insert material includes a wiring member having a length protruding through a through-hole formed in the foam body and the base substrate to a back side of the foam molded product, and
   the foam molded product further comprises a soft seal material formed inside the through-hole.

5. The foam molded product according to claim 1, wherein the detection unit included in the insert material is a touch sensor, and
   the touch sensor is mounted such that a detecting surface is exposed on a face of the foam body.

6. The foam molded product according to claim 5, wherein the surface material has light transparency, and
   the foam molded product further comprises a light source disposed on a back surface of the surface material or the touch sensor.

7. The foam molded product according to claim 1, wherein the detection unit included in the insert material is a tact switch, and
   the tact switch is mounted such that a pressing surface is exposed on a face of the foam body.

8. The foam molded product according to claim 1, wherein the surface material has light transparency,
   the display unit included in the insert material is a laminate of a label having a transmissive display portion and a light source, and
   the label is attached to be exposed on a face of the foam body.

9. The foam molded product according to claim 1, wherein the surface material has light transparency,
   the display unit included in the insert material is a dot matrix display device, and
   the dot matrix display device is mounted such that a display surface is exposed on a face of the foam body.

10. A method for manufacturing a foam molded product, the method comprising:
    an affixed part arrangement step of preparing a pair of molds including a first mold and a second mold, and arranging an affixed part in which an insert material including at least one of a display unit and a detection unit and a surface material are affixed together such that the surface material is in contact with a molding surface of the first mold, wherein in the affixed part, a flexible layer is affixed between the insert material and the surface material;

a mold closing step of closing the pair of molds;

a molding step of injecting a foam resin into a molding space formed by closing the molds, and foaming the foam resin to form a foam body;

a mold opening step of opening the pair of molds; and a removal step of removing a molded product in which the affixed part and the foam body are integrated.

11. A method for manufacturing a foam molded product, the method comprising:

a surface material arrangement step of preparing a pair of molds including a first mold and a second mold, and arranging a surface material on a molding surface of the first mold;

an insert material arrangement step of arranging an insert material including at least one of a display unit and a detection unit on one surface of the surface material opposite from an other surface of the surface material being in contact with the molding surface;

a flexible layer arrangement step of arranging a flexible layer between the surface material and the insert material;

a mold closing step of closing the pair of molds;

a molding step of injecting a foam resin into a molding space formed by closing the molds, and foaming the foam resin to form a foam body;

a mold opening step of opening the pair of molds; and a removal step of removing a molded product in which the surface material, the insert material, and the foam body are integrated.

12. The method for manufacturing a foam molded product according to claim 10, further comprising a base substrate arrangement step of arranging a base substrate on a molding surface of the second mold before the mold closing step.

13. The method for manufacturing a foam molded product according to claim 10, wherein the insert material has a wiring member having a length protruding to a parting surface of the first mold, and a soft seal material is formed on at least one of the parting surface of the first mold and a parting surface of the second mold.

14. The method for manufacturing a foam molded product according to claim 10, wherein the detection unit included in the insert material is a touch sensor or a tact switch.

15. The method for manufacturing a foamed molded product according to claim 10, wherein the surface material has light transparency, and the display unit included in the insert material is a laminate of a label having a transmissive display portion and a light source, or a dot matrix display device.

* * * * *